United States Patent
Cohen et al.

(10) Patent No.: US 12,442,915 B1
(45) Date of Patent: Oct. 14, 2025

(54) METHOD AND SYSTEM FOR DETERMINING DEVICE ORIENTATION WITHIN AUGMENTED REALITY

(71) Applicant: Infinitus Holdings Inc., Penn Valley, PA (US)

(72) Inventors: Joshua Ian Cohen, Penn Valley, PA (US); John Cronin, Jericho, VT (US)

(73) Assignee: INFINITUS HOLDINGS INC., Penn Valley, PA (US)

( * ) Notice: Subject to any disclaimer, the term of this patent is extended or adjusted under 35 U.S.C. 154(b) by 0 days.

(21) Appl. No.: 18/817,639

(22) Filed: Aug. 28, 2024

(51) Int. Cl.
  *G01S 13/90* (2006.01)
  *G06F 3/01* (2006.01)
  *G06T 11/00* (2006.01)
  *H01Q 3/26* (2006.01)

(52) U.S. Cl.
  CPC .......... *G01S 13/9021* (2019.05); *G06F 3/017* (2013.01); *G06T 11/00* (2013.01); *H01Q 3/2682* (2013.01)

(58) Field of Classification Search
  None
  See application file for complete search history.

(56) References Cited

U.S. PATENT DOCUMENTS

| | | | |
|---|---|---|---|
| 6,047,192 A | 4/2000 | Maloney et al. | |
| 6,307,475 B1 | 10/2001 | Kelley | |
| 8,421,615 B2 | 4/2013 | Ryu et al. | |
| 8,725,777 B2 | 5/2014 | Deking et al. | |
| 8,989,053 B1 | 3/2015 | Skaaksrud et al. | |
| 9,641,964 B2 | 5/2017 | Kulkarni et al. | |
| 9,900,742 B1 | 2/2018 | Thoresen et al. | |
| 9,989,633 B1 | 6/2018 | Pandey et al. | |
| 10,085,118 B1 | 9/2018 | Thoresen et al. | |
| 10,341,814 B2 | 7/2019 | Thoresen et al. | |
| 10,587,987 B2 | 3/2020 | Thoresen et al. | |
| 10,721,590 B2 | 7/2020 | Thoresen et al. | |
| 10,969,486 B2 | 4/2021 | Thoresen et al. | |
| 11,573,317 B2 | 2/2023 | Thoresen et al. | |

(Continued)

FOREIGN PATENT DOCUMENTS

| BR | 112019019353 | 4/2020 |
|---|---|---|
| CA | 3056593 | 9/2018 |

(Continued)

OTHER PUBLICATIONS

Barbera et al., "Signals from the crowd: uncovering social relationships through smartphone probes," Proceedings of the 2013 Conference on Internet Measurement Conference, IMC '13, Jan. 1, 2013, pp. 265-276.

(Continued)

*Primary Examiner* — Parul H Gupta
(74) *Attorney, Agent, or Firm* — POLSINELLI LLP

(57) ABSTRACT

A method for determining the orientation of a tracked device uses sensor data from inertial motion units, accelerometers, and synthetic aperture radar to capture images and analyze signal patterns, determining the device's facing direction. This method, integrated with an augmented reality framework, supports real-time interactions and precise placement of virtual markers and facilitates AR collaborative, interactive gameplay, asset tracking, and security applications, enabling accurate virtual object placement and real-time monitoring.

22 Claims, 3 Drawing Sheets

(56) References Cited

U.S. PATENT DOCUMENTS

| | | |
|---|---|---|
| 2002/0008657 A1 | 1/2002 | Poore |
| 2002/0019829 A1 | 2/2002 | Shapiro |
| 2002/0111173 A1 | 8/2002 | Hendrey et al. |
| 2002/0164995 A1 | 11/2002 | Brown et al. |
| 2002/0183072 A1 | 12/2002 | Steinbach et al. |
| 2003/0003933 A1 | 1/2003 | Deshpande et al. |
| 2003/0020623 A1 | 1/2003 | Cao et al. |
| 2003/0048224 A1 | 3/2003 | Benner et al. |
| 2003/0083046 A1 | 5/2003 | Mathis |
| 2003/0096621 A1 | 5/2003 | Jana et al. |
| 2003/0096628 A1 | 5/2003 | Bar-On et al. |
| 2003/0100326 A1 | 5/2003 | Grube et al. |
| 2003/0186716 A1 | 10/2003 | Dorenbosch et al. |
| 2004/0111184 A1 | 6/2004 | Chiappetta et al. |
| 2004/0235568 A1 | 11/2004 | Kim |
| 2005/0113123 A1 | 5/2005 | Torvinen |
| 2005/0149443 A1 | 7/2005 | Torvinen |
| 2005/0210104 A1 | 9/2005 | Torvinen |
| 2005/0221812 A9 | 10/2005 | Gailey et al. |
| 2005/0233776 A1 | 10/2005 | Allen et al. |
| 2009/0201850 A1 | 8/2009 | Davis et al. |
| 2011/0183683 A1 | 7/2011 | Das et al. |
| 2011/0273321 A1 | 11/2011 | Joshi et al. |
| 2012/0307645 A1 | 12/2012 | Grosman et al. |
| 2013/0044128 A1 | 2/2013 | Liu et al. |
| 2013/0142384 A1 | 6/2013 | Ofek |
| 2013/0222371 A1 | 8/2013 | Reitan |
| 2013/0231130 A1 | 9/2013 | Cherian et al. |
| 2013/0342564 A1 | 12/2013 | Kinnebrew et al. |
| 2014/0018059 A1* | 1/2014 | Noonan ............ H04W 52/283 455/419 |
| 2015/0116144 A1 | 4/2015 | Olmedo et al. |
| 2015/0302665 A1 | 10/2015 | Miller |
| 2015/0319568 A1 | 11/2015 | Haro et al. |
| 2015/0319687 A1 | 11/2015 | Farley et al. |
| 2015/0334768 A1 | 11/2015 | Ranasinghe et al. |
| 2015/0382148 A1 | 12/2015 | Agarwal et al. |
| 2016/0050525 A1 | 2/2016 | Droll et al. |
| 2016/0189416 A1 | 6/2016 | Naguib et al. |
| 2017/0006430 A1 | 1/2017 | Chao et al. |
| 2017/0026805 A1 | 1/2017 | Smith et al. |
| 2017/0089739 A1 | 3/2017 | Gallo et al. |
| 2017/0188066 A1 | 6/2017 | Gaidar et al. |
| 2017/0251400 A1 | 8/2017 | Jha et al. |
| 2018/0091940 A1 | 3/2018 | Gonzalez et al. |
| 2018/0270608 A1 | 9/2018 | Thoresen et al. |
| 2018/0270612 A1 | 9/2018 | Thoresen et al. |
| 2018/0365898 A1 | 12/2018 | Costa |
| 2019/0043259 A1 | 2/2019 | Wang et al. |
| 2019/0182627 A1 | 6/2019 | Thoresen et al. |
| 2019/0195998 A1* | 6/2019 | Campbell ............ G01S 13/426 |
| 2020/0025911 A1* | 1/2020 | Rappaport ............ H01Q 3/26 |
| 2020/0074743 A1 | 3/2020 | Zheng et al. |
| 2020/0118290 A1 | 4/2020 | Liu et al. |
| 2020/0137516 A1 | 4/2020 | Thoresen et al. |
| 2020/0309944 A1 | 10/2020 | Thoresen et al. |
| 2021/0318428 A1 | 10/2021 | Thoresen et al. |
| 2021/0405182 A1* | 12/2021 | Reynolds ............ G01S 13/887 |

FOREIGN PATENT DOCUMENTS

| | | |
|---|---|---|
| CN | 104569964 | 4/2015 |
| CN | 110637480 | 12/2019 |
| EP | 3596977 | 1/2020 |
| JP | 2017-067624 | 4/2017 |
| JP | 2020-515205 | 5/2020 |
| WO | WO 2016/109455 | 7/2016 |
| WO | WO 2018/169558 | 9/2018 |
| WO | WO 2019/089201 | 5/2019 |
| WO | WO 2019/113418 | 6/2019 |
| WO | WO 2019/210284 | 10/2019 |

OTHER PUBLICATIONS

Pang et al., "802.11 user fingerprinting," Proceedings of the 13th Annual ACM International Conference on Mobile Computing and Networking, ACM, Montreal, Quebec, Canada, Sep. 9, 2007, pp. 99-110.

Scheuner et al., "Probr—A Generic and Passive WiFi Tracking System" 2016 IEEE 41st Conference on Local Computer Networks.

EP Application No. 2017901233.7, Extended European Search Report dated Jul. 31, 2020 (PFN-002EP).

Israeli Application No. 269372, Office Action dated Jul. 27, 2021 (PFN-002IL).

Mexican Application No. MX/a/2019/010955, Second Office Action dated Jun. 27, 2022 (PFN-002MX).

Mexican Application No. MX/a/2019/010955, First Office Action dated Jan. 12, 2022 (PFN-002MX).

PCT Application No. PCT/US2018/064420, International Search Report and Written Opinion dated Mar. 1, 2019 (PFN-001PCT).

PCT Application No. PCT/US2018/064420, International Preliminary Report on Patentability dated Jun. 18, 2020 (PFN-001PCT).

PCT Application No. PCT/US2017/033428, International Search Report and Written Opinion dated Aug. 1, 2017 (PFN-002PCT).

PCT Application No. PCT/US2017/033428, International Preliminary Report on Patentability dated Sep. 26, 2019 (PFN-002PCT).

PCT Application No. PCT/US2018/055157, International Search Report and Written Opinion dated Dec. 20, 2018 (PFN-003PCT).

PCT Application No. PCT/US2018/055157, International Preliminary Report on Patentability dated May 14, 2020 (PFN-003PCT).

PCT Application No. PCT/US2019/029507, International Search Report and Written Opinion dated Jul. 2, 2019 (PFN-005PCT).

PCT Application No. PCT/US2019/029507, International Preliminary Report on Patentability dated Nov. 5, 2020 (PFN-005PCT).

U.S. Appl. No. 15/802,399, Office Action dated Aug. 30, 2018 (PFN-003).

U.S. Appl. No. 16/437,299, Office Action dated Feb. 5, 2020 (PFN-003COA).

U.S. Appl. No. 17/222,928, Office Action dated Sep. 29, 2022 (PFN-005COA).

U.S. Appl. No. 18/799,909, Joshua Ian Cohen, Graphene-Based Phased Array Antenna for Device Tracking, filed Aug. 9, 2024.

U.S. Appl. No. 18/808,382, Joshua Ian Cohen, Hybrid Phased Antenna Array for Device Tracking, filed Aug. 19, 2024.

U.S. Appl. No. 18/808,970, Joshua Ian Cohen, METAMATERIAL Asset Tags for Device Tracking in a 3D Space, filed Aug. 19, 2024.

U.S. Appl. No. 18/827,531, Joshua Ian Cohen, Voice Identification Via Radio Wave Demodulation, filed Sep. 6, 2024.

U.S. Appl. No. 18/826,822, Joshua Ian Cohen, Systems and Methods for Marker Placement in Augmented Reality, filed Sep. 6, 2024.

U.S. Appl. No. 18/826,846, Joshua Ian Cohen, Camera-Integrated Wireless 3D Mapping and Tracking System, filed Sep. 6, 2024.

U.S. Appl. No. 18/886,872, Joshua Ian Cohen, Augmented Reality Package Drop Point System, filed Sep. 16, 2024.

U.S. Appl. No. 18/891,448, Joshua Ian Cohen, Dynamic User-Tracking Digital Sinage System and Method, filed Sep. 20, 2024.

U.S. Appl. No. 18/890,430, Joshua Ian Cohen, Wireless Device Fingerprinting Systems and Methods, filed Sep. 19, 2024.

U.S. Appl. No. 18/897,590, Joshua Ian Cohen, High-Edge Antennas for Optimized SAR Performance, filed Sep. 26, 2024.

U.S. Appl. No. 18/895,234, Joshua Ian Cohen, Wireless Base Station Deployment for Target Mapping, filed Sep. 24, 2024.

* cited by examiner

METHOD AND SYSTEM FOR DETERMINING DEVICE ORIENTATION WITHIN AUGMENTED REALITY

FIELD OF THE DISCLOSURE

The present disclosure is generally related to augmented reality and more specifically to determining device orientation within augmented reality applications.

BACKGROUND

Currently, traditional methods for tracking and locating wireless devices often require direct interaction, such as app installation or GPS activation, which can be intrusive and inaccurate in indoor environments. There is a need for a system that can passively and accurately track devices without user intervention, providing precise location and orientation data even in complex, multi-level environments. Also, existing AR systems struggle with accurately placing and maintaining virtual objects in a shared environment, especially when used by multiple users in collaborative scenarios. This limitation hinders the development of interactive AR experiences that require precise spatial alignment and real-time updates, such as gaming, shopping, or asset tracking. Lastly, AR applications can suffer from inconsistencies due to variations in device orientation, user movements, and environmental factors. This results in a poor user experience, particularly in applications requiring precise virtual-physical interactions.

SUMMARY

Disclosed herein are methods and systems for determining device orientation in augmented reality (AR) applications to ensure consistent and accurate AR experiences utilizing sensor fusion and real-time processing to maintain alignment and responsiveness.

According to one aspect, a system includes a phased array antenna and an antenna module configured to detect, using the phased array antenna, wireless signals from at least one user device in an environment and determine a location of the at least one user device in the environment. The system also includes a synthetic aperture radar (SAR) system configured to transmit, via the phased array antenna, microwave radar signals into the environment; receive, via the phased array antenna, reflected signals from the environment including information about at least one of a distance and a movement of one or more objects in the environment; and generate a three-dimensional (3D) spatial map of the environment based on the reflected signals, where the 3D spatial map includes the location of the at least one user device. The system also includes a device module configured to connect to the at least one user device and receive, from the at least one user device, at least one of camera data and sensor data. The system further includes an orientation module configured to determine orientation information for the at least one user device based on the at least one of the camera and the sensor data. In addition, the system includes an integration module configured to integrate data including the 3D spatial map, the location of the at least one user device, the orientation information, and the at least one of the camera data and the sensor data to create an augmented reality (AR) representation of the environment.

In some embodiments, the antenna module determines the location of the at least one user device by triangulation and/or trilateration.

In some embodiments, the antenna module operates in a passive mode by detecting the wireless signals from the at least one user device without first pinging the at least one user device.

In some embodiments, the antenna module operates in an active mode by initially pinging the at least one user device via the phased array antenna before detecting the wireless signals from the at least one user device.

In some embodiments, the antenna module utilizes at least one of a Kalman filter, a Joint Probabilistic Data Association (JPDA) operation, and/or a Multiple Signal Classification (MUSIC) algorithm for refining the location of the at least one user device.

In some embodiments, the phased array antenna includes multiple antenna elements that are electronically steerable to direct a radar beam in different directions without physically moving the phased array antenna.

In some embodiments, the SAR module uses time delay and/or frequency shift information from the reflected signals to determine the at least one of the distance and the movement of the one or more objects.

In some embodiments, the sensor data includes at least one of accelerometer data and gyroscope data.

In some embodiments, the orientation module includes or utilizes an AR framework module to overlay the AR representation of the environment in real time onto a live camera feed on a user device.

In some embodiments, the orientation module continuously updates the orientation information in real time to reflect any changes in the location or movement of the at least one user device.

In some embodiments, the integration module integrates at least one virtual marker into the AR representation and provides a gesture-based interface to allow a user to interact with the AR representation using one or more gestures.

According to another aspect, a method includes detecting, using a phased array antenna, wireless signals from at least one user device in an environment. The method also includes determining a location of the at least one user device in the environment. The method further includes transmitting, via a synthetic aperture radar (SAR) system using the phased array antenna, microwave radar signals into the environment. The method additionally includes receiving, via the phased array antenna, reflected signals from the environment including information about at least one of a distance and a movement of one or more objects in the environment. Further, the method includes generating a three-dimensional (3D) spatial map of the environment based on the reflected signals, where the 3D spatial map includes the location of the at least one user device. In addition, the method includes connecting to the at least one user device and receiving, from the at least one user device, at least one of camera data and sensor data. The method also includes determining orientation information for the at least one user device based on the at least one of the camera and the sensor data. The method further includes integrating data including the 3D spatial map, the location of the at least one user device, the orientation information, and the at least one of the camera data and the sensor data to create an augmented reality (AR) representation of the environment.

In some embodiments, determining the location of the at least one user device includes determining the location of the at least one user device by triangulation and/or trilateration.

In some embodiments, detecting comprises passively detecting the wireless signals from the at least one user device without first pinging the at least one user device.

In some embodiments, detecting comprises initially pinging the at least one user device via the phased array antenna before actively detecting the wireless signals from the at least one user device.

In some embodiments, determining the location of the at least one user device includes refining the location using at least one of a Kalman filter, a Joint Probabilistic Data Association (JPDA) operation, and/or a Multiple Signal Classification (MUSIC) algorithm.

In some embodiments, the phased array antenna includes multiple electronically steerable antenna elements, and wherein transmitting includes directing a radar beam in different directions without physically moving the phased array antenna.

In some embodiments, the at least one of a distance and a movement of the one or more objects in the environment are determined by time delay and/or frequency shift information from the reflected signals.

In some embodiments, receiving sensor data includes receiving at least one of accelerometer data and gyroscope data.

In some embodiments, integrating includes overlaying the AR representation of the environment in real time onto a live camera feed on a user device.

In some embodiments, determining orientation information includes continuously updating the orientation information in real time to reflect any changes in the location or movement of the at least one user device.

In some embodiments, integrating includes integrating at least one virtual marker in the AR representation and providing a gesture-based interface to allow a user to interact with the AR representation using one or more gestures.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
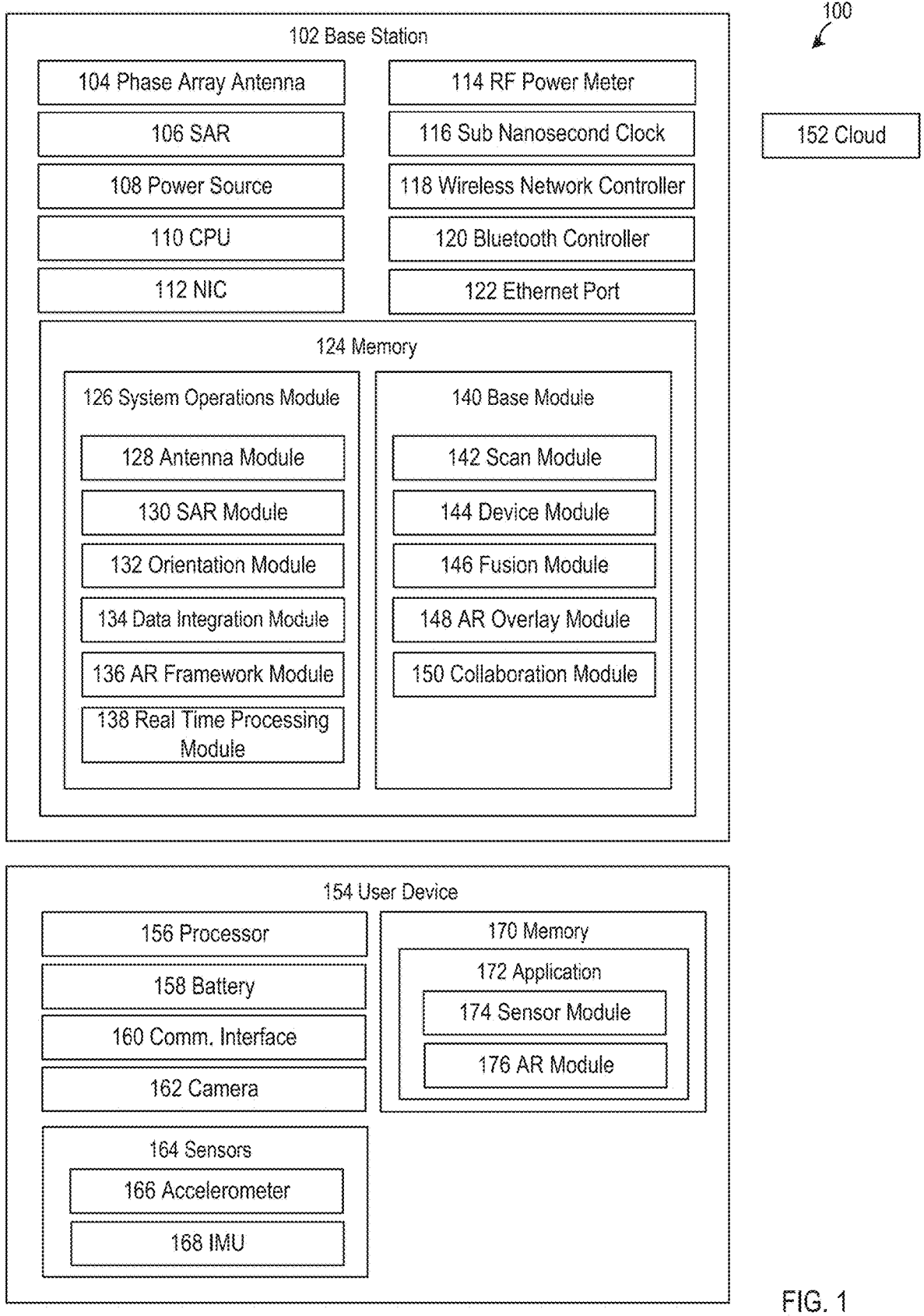
FIG. 1 is a schematic diagram of an integrated system for device orientation determination within augmented reality applications according to an embodiment.

FIG. 1 illustrates a method for an integrated system for device orientation determination within augmented reality applications. This method includes a base station 102 designed to detect, track, and authenticate wireless devices within a defined area. The base station 102 may be equipped with advanced hardware and software capabilities that enable it to utilize a phased array antenna 104 capable of performing Synthetic Aperture Radar (SAR) 106 to create detailed, high-resolution 3D maps of its surroundings. In some embodiments, the SAR 106 system transmits microwave signals, which bounce off objects and return to the antenna 104, allowing the system to gather spatial information regardless of weather conditions or lighting. In some embodiments, the base station 102 passively detects signals emitted by wireless devices, such as those from Wi-Fi and Bluetooth, without the need for those devices to opt-in or run any specific application. By analyzing these signals, the base station 102 may triangulate the exact position of each device within its range. This passive signal detection capability ensures that the system can locate and track devices without requiring any active participation from the user. In some embodiments, the base station 102 may integrate the positional data with the SAR 106 generated 3D map to provide a comprehensive understanding of the environment. The integration may be achieved through advanced data fusion algorithms, which combine information from various sources to enhance accuracy and reliability. In some embodiments, the system may also capture images using the device's 154 camera 162, further refining the device's 154 location and orientation by analyzing signal patterns and identifying obstructions, such as the user's body. In some embodiments, the base station 102 may also support augmented reality, or AR, applications.

The base station 102 may overlay virtual markers and other AR content onto the real-world 3D map, allowing for interactive and immersive experiences. Users may interact with this AR content through gesture-based interfaces, which the base station 102 supports by recognizing and processing natural hand movements. In some embodiments, this functionality may be enhanced by computer vision algorithms that detect the user's hand and body position from captured images, providing additional context for positioning and orientation. In some embodiments, the base station 102 may be designed to facilitate collaborative AR applications, asset tracking, and security monitoring. The base station 102 may manage multiple users and devices 154 within a shared AR environment, enabling precise interaction and real-time updates. For asset tracking, the system monitors the movement of items and alerts users if any unauthorized movements are detected. In terms of security, the base station 102 may monitor foot traffic and detect unauthorized access or suspicious activities within its coverage area. In some embodiments, the base station 102 may be responsible for capturing wireless signals and metadata from nearby devices 154. In some embodiments, the base station 102 may operate in monitor mode to intercept management frames like probe requests, which contain information about the devices 154, such as their MAC addresses and connection histories. In some embodiments, the base station 102 may build comprehensive device profiles and track their movement across different zones based on the collected data, thereby enhancing security and providing valuable insights for various applications.

Further, embodiments may include a phased array antenna 104, which includes an array of elements that may function in both passive and active modes. In the passive mode, the antenna 104 does not transmit any signals but listens to all wireless traffic within its vicinity, capturing signals without interacting with the devices being monitored. In some embodiments, the passive approach allows for discreet monitoring and reduces the likelihood of detection by the tracked devices. In the active mode, the antenna 104 may transmit signals and then receive the reflected signals back, enabling more dynamic interaction with the environment. The phased array antenna 104 may be designed to operate at 2.4 GHz, with each antenna element being 2.1 inches in size, forming a 16-channel array that measures approximately 20 inches by 20 inches. In some embodiments, the configuration allows the antenna 104 to cover a wide area and detect signals from multiple devices simultaneously. The array's design supports both angle of arrival, or AoA, measurements and Doppler shift calculations, which may be used to determine the direction and movement of the tracked devices. The antenna 104 may also include null space reduction, which helps identify and minimize the effects of nulls or dead zones in the signal reception pattern. The null space reduction may analyze the signals received from different antennas in the array and adjust the reception parameters to improve signal clarity and reduce interference. Integrated with an antenna module 128, the phased array antenna 104 continuously monitors various environmental factors that may affect signal reception. By measuring and adjusting for these variations in real time, the system ensures optimal signal reception and processing accuracy. In some embodiments, the phased array antenna 104 may support advanced signal processing capabilities. The phased array antenna 104 may work in conjunction with tools such as the Kalman filter for prediction and smoothing of device positions, the Joint Probabilistic Data Association, or JPDA, for accurate data association in environments with multiple devices, and an outlier module to eliminate false signals and improve overall tracking accuracy. These features collectively enable the system to provide precise and reliable tracking and interaction with wireless devices in its vicinity.

Further, embodiments may include an SAR 106 or synthetic aperture radar, which may be designed to create detailed 3D maps of the surrounding environment. The SAR 106 may operate by transmitting microwave radar signals and utilizing the reflections from various surfaces to construct high-resolution images. The SAR 106 system may begin by emitting microwave radar pulses toward the target area. These pulses may be generated by the base station's 102 radar transmitter and directed through a phased array antenna 104. The use of microwave frequencies allows the radar signals to penetrate atmospheric conditions such as clouds, fog, and rain, which typically obstruct optical imaging systems. When the radar pulses hit objects in the target area, they reflect towards the radar system. Different materials and surfaces reflect these signals in unique ways, providing varied data that the SAR 106 system may use to differentiate between objects and surfaces. The time delay and frequency shift in the reflected signals carry information about the distance and movement of the objects. The SAR 106 utilizes the phased array antenna 104 to electronically steer the radar beam across the target area. In some embodiments, the steering capability allows the system to simulate the movement typically used to create a synthetic aperture. By varying the direction of the radar beam and collecting reflections from multiple angles, the SAR 106 system may effectively generate a larger synthetic aperture. The SAR 106 system continuously collects radar data from these electronically steered beams.

In some embodiments, the process captures reflections from various angles and positions within the target area, similar to how data would be collected from a moving platform. The phased array antenna's 104 ability to rapidly change the direction of the radar beams enhances the spatial resolution of the collected data. The data collected by the SAR 106 system may be processed using advanced algorithms to combine the multiple radar reflections into a coherent image. In some embodiments, the processing corrects for any variations in the beam direction and extracts detailed spatial information. In some embodiments, techniques such as back-projection, Fourier transforms, and filtering may be applied to convert the raw radar data into a high-resolution 3D image. The SAR 106 data may be used to generate 3D maps of the environment. In some embodiments, the maps may be created by analyzing the time delay and intensity of the reflected signals to calculate the distance to each point in the target area. By stitching together data from multiple electronically steered beams, the SAR 106 system constructs a comprehensive 3D representation of the landscape, buildings, and other objects. In some embodiments, the SAR 106 may be used within the base station 102 to create precise 3D maps that support augmented reality, or AR, applications, asset tracking, and security monitoring. The high-resolution 3D data enables accurate placement of virtual markers, enhances gesture-based interfaces, and provides real-time spatial context for user interactions. By integrating SAR 106 data with other sensor inputs, the system ensures a robust and comprehensive understanding of the environment, facilitating advanced AR experiences and precise device tracking.

Further, embodiments may include a power source 108, which may be an AC power supply, providing a stable and continuous source of electricity for the adaptable base station 102. In some embodiments, the AC power supply ensures that the base station 102 operates without interruption, supporting the continuous monitoring and reporting of wireless device activities within the coverage area. The base station 102 is designed to be adaptable to various environments, and in some embodiments, it may rely on DC power sources, such as batteries or rechargeable battery packs. These portable power sources 108 enable the base station 102 to be used in dynamic or remote environments where access to AC power is limited or unavailable. In some embodiments, rechargeable batteries may provide the flexibility of being recharged and reused, making them suitable for operations that require mobility or temporary setups, such as event monitoring, security patrols, or search and rescue missions.

Further, embodiments may include a CPU 110, or central processing unit, which may be the component responsible for executing instructions and managing the operations of the system in real time. The CPU 110 may be a highly integrated electronic circuit that performs arithmetic, logic, control, and input/output operations specified by the instructions in the program. In some embodiments, the CPU 110 in the base station 102 may be designed to handle the demanding processing requirements associated with the various technologies integrated into the system, such as SAR 106, sensor data fusion, and AR applications. In some embodiments, the CPU 110 may be a multi-core processor featuring multiple processing units or cores on a single chip. Each core is capable of executing its instructions independently of the others, allowing for parallel processing. The multi-core architecture allows the base station 102 to handle concurrent tasks such as data collection from SAR 106, processing sensor data, managing communications with user devices 154, and running AR applications in real time, ensuring efficient and continuous system operation.

Further, embodiments may include a network interface card, or NIC 112, which may be a hardware component that enables the base station 102 to connect to a network. The NIC 112 may be designed to handle some or all of the functions for establishing and maintaining network communication. In some embodiments, the NIC 112 may include several components, such as the network interface controller, transceivers, and connectors, housed on a single board. The NIC 112 may operate by interfacing with the base station's 102 operating system and network software to manage data transmission and reception over a network. In some embodiments, the NIC 112 may provide a physical interface for the network cable, such as Ethernet, Wi-Fi, or other types of network connections. In some embodiments, the NIC 112 may contain transceivers that convert electrical signals to and from network cables into data the base station 102 can process. In some embodiments, the NIC 112 may include connectors and other circuitry to manage the electrical signals and ensure efficient and accurate data transmission. The NIC 112 may prepare data for transmission over the network and to process incoming data. The NIC 112 may encapsulate data packets according to the network protocols being used, manage error detection and correction, and control the flow of data to prevent congestion. The NIC 112 may handle the conversion of data from parallel to serial form for transmission over the network medium and from serial to parallel form upon receipt. In some embodiments, the NIC 112 may include firmware or software that interfaces with the base station's 102 operating system. The software component may be responsible for handling the low-level operations of network communication, such as packet generation, data buffering, and signal encoding/decoding. The NIC 112 firmware may ensure that the hardware functions are abstracted in a way that the operating system can manage network communication seamlessly, allowing for network drivers to facilitate communication between the base station 102 and the network. In some embodiments, the NIC 112 may include a network interface controller, which may be a chip or a set of integrated circuits that handles the processing of network data and communication tasks. The network interface controller may be responsible for the actual management of data transfer between the computer's internal bus system and the network media.

In some embodiments, the network interface controller may manage the sending and receiving of data packets, ensuring that data is transmitted correctly and efficiently across the network. When data is sent from the base station 102, the controller takes parallel data from the base station's 102 bus and converts it into serial data to be sent over the network cable. Conversely, when data is received, the controller converts serial data from the network back into parallel data for the base station 102 to process. In some embodiments, the controller may handle error detection and correction by using various algorithms to check the integrity of the data packets being transmitted and received to ensure that errors are detected and corrected before the data reaches its destination. In some embodiments, the controller may manage the data buffering process by temporarily storing data in buffers to smooth out the differences in data transmission rates between the base station 102 and the network to help manage network congestion and ensure that data flows smoothly without overwhelming either the sending or receiving ends. In some embodiments, the controller may manage network protocols by handling the low-level operations used by different network protocols, such as Ethernet or Wi-Fi, including addressing, packet framing, and collision detection and avoidance, allowing the NIC 112 to communicate effectively over various types of networks and ensures compatibility with different networking standards.

Further, embodiments may include an RF power meter 114, which may measure and monitor the power levels of radio frequency signals transmitted and received by the phased array antenna 104. The RF power meter 114 includes a high-precision sensor capable of detecting RF power across a wide range of frequencies, an analog-to-digital converter, or ADC, for accurate signal processing, and a microcontroller unit, or MCU, to manage data collection and analysis. The sensor continuously measures the RF power of signals, converting these measurements into electrical signals that the ADC digitizes. The digitized data is then processed by the MCU, which interprets the power levels and provides real-time feedback to the system. In some embodiments, the RF power meter 114 ensures that the antenna 104 operates within optimal power levels, avoiding underpowered or overpowered conditions that could degrade performance. The power meter 114 may dynamically adjust the transmission power to maintain consistent signal strength and quality, compensating for environmental changes or variations in signal propagation to maintain efficient communication links and prevent signal loss or distortion.

Further, embodiments may include a sub-nanosecond clock 116, which may be an advanced timing device designed to provide highly accurate and precise synchronization for the operations of the phased array antenna 104. The sub-nanosecond clock 116 may generate timing signals with a resolution of less than one nanosecond for applications requiring ultra-high precision in signal processing and communication. In some embodiments, the sub-nanosecond clock 116 includes an oscillator, such as a crystal oscillator or an atomic clock, that ensures minimal drift and high accuracy over time. The oscillator may be connected to a phase-locked loop, or PLL, a circuit that multiplies the base frequency to achieve the desired sub-nanosecond resolution. In some embodiments, the PLL may ensure that the timing signals remain stable and synchronized with the system's operations. In some embodiments, the sub-nanosecond clock 116 may ensure that the transmission and reception of signals are accurately synchronized to maintain the integrity of the communication link and avoid timing errors that could lead to data corruption or loss. In some embodiments, the sub-nanosecond clock 116 provides precise timestamps for the received signals to allow the base station 102 to accurately calculate the time differences between signals arriving at different elements of the phased array to determine the exact direction of the incoming signals. In some embodiments, the sub-nanosecond clock 116 may enable the base station 102 to measure minute changes in the frequency of the received signals due to the Doppler effect, allowing for accurate tracking of the speed and direction of the devices. In some embodiments, the sub-nanosecond clock 116 may provide the timing reference for the digital signal processor, or DSP, and other processing units within the base station 102 to ensure that all data processing tasks are performed in a synchronized manner.

Further, embodiments may include a wireless network controller 118, which may be responsible for managing wireless communications between the base station 102 and the wireless devices within their vicinity. In some embodiments, the wireless network controller 118 may oversee the operations of the NIC 112, including signal monitoring, data capture, and communication with other system components. The wireless network controller 118 may operate by placing the NIC 112 into a specific mode, such as monitor mode, which allows the NIC 112 to passively listen to all wireless traffic within its range without initiating any connections or interactions with the devices being monitored. The wireless network controller 118 may capture various wireless frames, particularly management frames such as probe requests. These frames contain useful information, including MAC addresses, SSIDs, signal strengths, and supported rates of the wireless devices. By capturing and processing these frames, the wireless network controller helps build a comprehensive profile of each detected device. In some embodiments, the wireless network controller 118 may periodically scan different frequency channels. This scanning process allows the NIC 112 to detect devices operating on various channels, minimizing the chances of missing any signals. Additionally, the wireless network controller 118 may engage in channel hopping, in which the NIC 112 frequently switches between channels at specified intervals, further enhancing the detection capability by broadening the range of monitored frequencies. The wireless network controller 118 may perform data extraction to isolate relevant information from the frames, which may involve focusing on specific details such as MAC addresses, network names (SSIDs), and signal strengths. The extracted data is then preprocessed to filter out irrelevant or redundant information, ensuring that valuable and pertinent data is retained. The refined data may be structured in a format that facilitates efficient transmission to the system's servers for further processing and analysis. In some embodiments, the wireless network controller 118 may ensure that the data is serialized and encrypted, maintaining the integrity and security of the information during transmission.

Further, embodiments may include a Bluetooth controller 120, which may be responsible for managing Bluetooth communications between the base station 102 and Bluetooth-enabled devices. The Bluetooth controller 120 may control the Bluetooth chipset, enabling the detection, tracking, and processing of Bluetooth signals within the base station's 102 vicinity. In some embodiments, the Bluetooth controller 120 may operate by placing the Bluetooth chipset into a passive monitoring mode. In this mode, the chipset listens to Bluetooth signals within its range without actively connecting or interacting with the devices being monitored. The Bluetooth controller 120 may capture various Bluetooth packets, including device names, Bluetooth addresses, signal strengths, supported services, and other metadata. By capturing and processing these packets, the Bluetooth controller 120 builds a comprehensive profile of each detected Bluetooth-enabled device. In some embodiments, the Bluetooth controller 120 may perform data extraction to isolate relevant information from the packets, which may involve focusing on specific details such as Bluetooth addresses, device names, and signal strengths, which form the basis for further analysis and processing. The extracted data is then preprocessed to filter out irrelevant or redundant information, ensuring that valuable and pertinent data is retained. The refined data is structured in a format that facilitates efficient transmission to the system's servers for further processing and analysis. The Bluetooth controller 120 ensures that the data is serialized and encrypted, maintaining the integrity and security of the information during transmission.

Further, embodiments may include an ethernet port 122, which may be a hardware interface that enables wired network connectivity for the base station 102 and other system components. The ethernet port 122 may facilitate the transmission and reception of data between the base station 102 and the system's servers or other networked devices over a wired Ethernet connection. In some embodiments, the ethernet port 122 may enable the base station 102 to transmit captured and processed data to the system's servers for further analysis and storage. This data may include wireless signal information, device metadata, and other relevant tracking and authentication details.

Further, embodiments may include a memory 124, which may be implemented as flash memory, which contains code logic for various functions, including monitoring, reporting, and other processing tasks. The memory 124 may contain software, such as the system operations module 126, antenna module 128, SAR module 130, orientation module 132, data integration module 134, AR framework module 136, and real-time processing module 138. The memory 124 may be responsible for temporarily storing the captured wireless signals and their metadata, ensuring that the data is readily accessible for preprocessing and transmission to the system's servers. In some embodiments, the memory 124 may store configuration settings, firmware updates, and other files that enable the base station 102 to function efficiently and effectively.

Further, embodiments may include a system operations module 126, which may integrate various advanced technologies and algorithms to ensure seamless and precise operation of the system. The system operations module 126 orchestrates the functionalities of different components, such as phased array antennas 104, SAR 106, IMUs 168, accelerometers 166, and sensor 164 data collection units, to achieve accurate spatial context and real-time interactions. In some embodiments, the system operations module 126 may include an antenna module 128 and SAR module 130, which may be responsible for performing synthetic aperture radar scans to create high-resolution 3D maps of the environment. The phased array antenna 104 may electronically steer its radar beam, scanning the surroundings efficiently and capturing detailed spatial information. The SAR 106 processing algorithms may then process the reflected radar signals to generate coherent images, which form the basis for the 3D maps. The antenna module 128 may leverage the phased array antenna's 104 capabilities to passively detect signals emitted by user devices, such as Wi-Fi or Bluetooth signals. The passive approach allows the system to triangulate the precise position of the device 154 without active transmission, reducing the risk of detection and interference. Advanced signal processing techniques may be applied to these passively detected signals to determine the exact coordinates of the device within the 3D space generated by the SAR module 130. In some embodiments, the system operations module 126 may include the orientation module 132, which continuously collects motion and orientation data from the user device 154. The user device's 154 IMUs 168 and accelerometers 166 gather detailed information on its movement and orientation. In some embodiments, the user device 154 data is fused using sophisticated sensor fusion algorithms to provide accurate real-time orientation information. In some embodiments, the user device's 154 camera 162 may periodically capture images, which help analyze signal patterns and determine the user device's 154 facing direction, further refining the spatial context. In some embodiments, the system operations module 126 may include a data integration module 134, in which the high-resolution 3D maps from the SAR module 130 are overlaid with the precise positional data of the user device 154. In some embodiments, the system takes into account the user's hand and body position, identified through the captured images and IMU 168 data, ensuring that the AR content aligns perfectly with the real world.

In some embodiments, the system operations module 126 may include an AR framework module 136, which utilizes the comprehensive spatial context provided by the data integration module 134 to enable a range of AR interactions. In some embodiments, camera 162 images and IMU 168 readings refine the user device's 154 position and orientation further. In some embodiments, computer vision algorithms may detect the user's hand and body position, enhancing the precision of AR content placement. In some embodiments, virtual markers, interactive objects, and navigation aids are overlaid onto the 3D map, ensuring they align correctly with real-world objects and surfaces. In some embodiments, enhanced gesture-based interfaces may allow users to interact with virtual markers and AR content using natural hand movements, such as tapping, swiping, pinching, and dragging.

In some embodiments, the system operations module 126 may include a real-time processing module 138, which ensures that all data fusion, spatial context generation, and AR interactions occur with minimal latency. In some embodiments, the real-time processing module 138 may implement real-time data fusion algorithms to combine SAR 106 data, user and phone position information, and sensor 164 data from the user device 154. In some embodiments, the real-time processing module 138 may facilitate interactive gameplay, asset tracking, and security monitoring using the wireless base station's 102 capabilities. The system may perform angle-of-arrival operations and apply filters to estimate the locations of multiple devices accurately. In some embodiments, the real-time processing module 138 may support asset tracking by monitoring the movement of items and providing notifications if an asset is moved or tampered with.

Further, embodiments may include an antenna module 128 that enables both passive and active detection of user devices 154. In passive mode, the antenna module 128 operates by listening to all wireless traffic within its vicinity without transmitting any signals. The passive approach allows the base station 102 to capture signals emitted by user devices 154, such as Wi-Fi and Bluetooth signals, without interacting with the devices being monitored. The phased array antenna 104, equipped with multiple elements, detects these signals and uses advanced signal processing techniques to determine the exact position of the devices. By analyzing the angle of arrival, or AoA, and signal strength, the antenna module 128 may triangulate the precise coordinates of the devices within the environment. The passive detection capability allows for discreet monitoring, reducing the likelihood of detection by the tracked devices and avoiding interference with their operations.

In active mode, the antenna module 128 switches from only listening to also transmitting signals. The active mode may be used when more dynamic interaction with the environment is desired. The phased array antenna 104 transmits signals, which then reflect off objects and devices in the environment. By receiving the reflected signals, the system can perform detailed analysis to understand the surroundings better. The active mode process may involve measuring the time delay and frequency shift of the reflected signals to calculate distances and movements. The active mode enhances the base station's 102 ability to track device movements more dynamically. The antenna module's 128 phased array design supports both passive and active operations efficiently. The antenna elements may electronically steer the radar beam to focus on specific areas, improving the accuracy of detection and tracking. In passive mode, this beam steering helps in better-capturing signals from various angles, enhancing the triangulation process. In active mode, it ensures that the transmitted signals cover a wide area and the reflected signals are accurately received and processed. In some embodiments, the antenna module 128 may include null space reduction techniques to identify and minimize dead zones in the signal reception pattern to ensure clear signal reception and reduce interference to maintain high accuracy in both passive and active modes. In some embodiments, the antenna module 128 may also utilize Kalman filters for prediction and smoothing of device positions and the Joint Probabilistic Data Association, or JPDA, for accurate data association in environments with multiple devices.

Further, embodiments may include a SAR module 130, which may create detailed spatial maps and accurately detect the positions of devices in the environment. The SAR module 130 leverages SAR technology integrated with a phased array antenna 104 to achieve high-resolution 3D mapping and precise device tracking. The SAR module 130 may transmit microwave radar signals towards the target area. These signals, once emitted from the SAR 106 system, travel through the environment, interacting with various objects and surfaces. The signals then reflect back to the SAR 106 antenna 104, carrying valuable information about the distance and movement of the objects they encountered. The phased array antenna 104 includes multiple antenna elements that may be electronically steered to direct the radar beam in different directions without physically moving the antenna 104, allowing for efficient scanning of the environment and improving the resolution and accuracy of the data collected. For example, the SAR 106 system initiates the process by transmitting radar signals towards the target area. The phased array antenna 104 emits these signals, which are designed to cover a broad spatial area to capture comprehensive data. As the radar signals travel through the environment, they encounter various objects and surfaces, reflecting back to the antenna 104. The characteristics of these reflected signals, such as time delay and frequency shift, provide information about the objects' distance and movement.

The SAR 106 system, with the phased array antenna 104, collects the reflected signals from multiple positions. In some embodiments, the phased array antenna's 104 ability to electronically steer the radar beam may allow it to gather data from different angles and perspectives, effectively simulating a larger antenna and improving the resolution of the collected data. The collected data undergoes signal processing algorithms which combine the multiple radar reflections into a coherent image, correcting for any motion of the radar platform and extracting detailed spatial information resulting in a high-resolution 3D map that accurately represents the environment. The processed data is used to generate a 3D map, providing a detailed spatial representation of the surroundings. In some embodiments, the map may include precise information about the positions and movements of objects within the scanned area. In some embodiments, the system may accurately determine the position of user devices 154 by using the 3D map and additional sensor 164 data.

Further, embodiments may include an orientation module 132, which may be responsible for accurately determining the orientation of user devices 154. The orientation module 132 may integrate data from various sensors 164 from the user device 154 to provide precise spatial context and ensure real-time interaction within the augmented reality framework. In some embodiments, the orientation module 132 may collect and use data from the user device's 154 IMU 168, accelerometers 166, camera 162, etc., to determine position and orientation. For example, the data from the user device 154 may be continuously collected, such as from the user device's 154 IMUs 168 and accelerometers 166. In some embodiments, the IMUs 168 may include a combination of gyroscopes and accelerometers 166, which measure angular velocity and linear acceleration, respectively, and provide information about the device's motion and orientation changes. In some embodiments, the orientation module 132 may employ advanced sensor fusion algorithms to combine data from the IMUs 168 and accelerometers 166. For example, sensor fusion may integrate multiple sources of information to mitigate the limitations of individual sensors, resulting in a more reliable and robust determination of the device's orientation. In some embodiments, the user device's 154 camera 162 may capture images of the user holding the device, and the images may be analyzed to understand the user's interaction with the device and to identify any obstructions, such as the user's body, which might affect the orientation determination. In some embodiments, the orientation module 132 may apply algorithms to analyze the signal patterns from the IMUs 168, accelerometers 166, and the SAR 106 system. In some embodiments, the analysis may include identifying the user device's 154 facing direction and understanding its orientation relative to the surrounding environment. In some embodiments, the SAR 106 system may assist in mapping the environment and providing spatial references that enhance orientation accuracy. The orientation module 132 may identify obstructions that might impact the field of view of the device's camera 162 by combining the visual data from the camera 162 and the signal patterns. For example, if the user's body is blocking part of the view, the system can account for this in its calculations. The orientation module 132 may determine the precise orientation of the user device 154 by utilizing the fused sensor data, image analysis, and obstruction information, including calculating the user device's 154 pitch, roll, and yaw angles, which describe its rotation in three-dimensional space. In some embodiments, the orientation module 132 may continuously update the orientation information in real-time, ensuring that any changes in the user device's 154 position or movement are promptly reflected. In some embodiments, the determined orientation data may be integrated into the augmented reality framework, enabling precise placement of virtual markers and enhancing gesture-based interfaces to ensure that the virtual objects appear correctly aligned with the real world, providing an immersive and interactive user experience.

Further, embodiments may include a data integration module 134, which integrates data from various sources to create a comprehensive spatial understanding of the environment and the devices within it. The data integration module 134 may integrate sensor 164 data, SAR 106 generated 3D maps, and user device 154 position information to ensure accurate and seamless augmented reality experiences. In some embodiments, the data integration module 134 may be designed to combine and process data from multiple sources to generate a detailed and accurate spatial representation of the environment. The data integration module 134 may involve generating a 3D map of the environment using data from the SAR 106 system. In some embodiments, the SAR 106 system scans the surroundings. It captures high-resolution spatial data, which is processed to create a detailed 3D map, which includes information about the physical structures, objects, and other elements within the area. The data integration module 134 may receive data about the user's position and the user device's 154 position from the antenna module 128 and other sensors, including the precise coordinates of the user device 154 and its orientation. In some embodiments, the data integration module 134 may provide a real-time view of where the user and the user device 154 are located within the mapped environment by overlaying this position information onto the 3D map. The data integration module 134 may continuously collect sensor data from the device's IMUs 168, accelerometers 166, and cameras 162. The sensor data may be integrated with the 3D map and position information to provide a comprehensive understanding of the device's state and its interaction with the environment. The data integration module 134 may employ advanced algorithms to analyze signal patterns from various sensors, including SAR 106, IMUs 168, and accelerometers 166. In some embodiments, the algorithms may detect and interpret the user device's 154 movements and orientation changes, ensuring that the integrated data accurately reflects the device's state. In some embodiments, the data integration module 134 may identify any obstructions, such as the user's body or other objects, that might affect the user device's 154 field of view or signal reception by analyzing the integrated sensor data and the 3D map. The data integration module 134 may adjust the data accordingly to ensure that these obstructions are accounted for, maintaining the accuracy of the spatial representation. In some embodiments, the data integration module 134 may operate in real-time and continuously update the spatial representation as new sensor data is received. The data integration module 134 enables precise placement of AR content within the 3D map using the integrated and processed data. In some embodiments, virtual markers, objects, and interfaces may be accurately positioned based on the user device's 154 location and orientation, ensuring that the AR content aligns correctly with the real-world view. The data integration module 134 may support enhanced gesture-based interfaces by providing accurate spatial data. In some embodiments, users may interact with virtual markers and AR content using natural hand movements. In some embodiments, the system may recognize gestures such as tapping, swiping, pinching, and dragging, allowing users to manipulate virtual objects and navigate through AR interfaces intuitively.

Further, embodiments may include an AR framework module 136, which may be responsible for enabling augmented reality, or AR, interactions by leveraging data from various sensors and integrating it with advanced computer vision and signal processing techniques. The AR framework module 136 may provide the foundation for creating immersive and interactive AR experiences. For example, the AR framework module 136 orchestrates the seamless integration of real-world data and virtual content, facilitating a range of applications from interactive gameplay to navigation aids and informational overlays. In some embodiments, the AR framework module 136 utilizes sensor data, computer vision algorithms, and real-time processing capabilities to deliver accurate and responsive AR interactions. The AR framework module 136 may begin by collecting data from the user device's 154 cameras 162, IMUs 168, and accelerometers 166. In some embodiments, the cameras 162 may capture images of the environment, the IMUs 168 and accelerometers 166 may provide information about the user device's 154 motion and orientation. The AR framework module 136 may employ computer vision algorithms to process the camera images once the data is collected. In some embodiments, the algorithms analyze the images to detect specific features, such as edges, corners, and textures, for understanding the environment and identifying objects. In some embodiments, the computer vision algorithms may also track the user's hand and body positions, providing additional context for positioning and orientation. The AR framework module 136 may continuously refine the user device's 154 position and orientation by combining the sensor data with the computer vision analysis. In some embodiments, the fusion of data ensures that the user device's 154 location is accurately determined, even in dynamic environments. The refined position and orientation data are then used to align the AR content correctly with the real-world view. The AR framework module 136 places virtual markers within the 3D map created by the data integration module 134 with the accurate position and orientation information. In some embodiments, the markers may represent interactive objects, navigation points, or informational overlays. In some embodiments, the placement of the virtual markers is precise to ensure that they align correctly with real-world objects and surfaces. The AR framework module 136 renders the AR content in real-time, overlaying it onto the live camera 162 feed. The real-time rendering capability allows users to see and interact with virtual objects as if they were part of the real world. In some embodiments, the rendering process may take into account the lighting conditions, occlusions, and other factors to enhance the realism of the AR content. The AR framework module 136 may support enhanced gesture-based interfaces, allowing users to interact with virtual markers and AR content using natural hand movements. In some embodiments, gesture recognition algorithms may detect gestures such as tapping, swiping, pinching, and dragging, enabling users to manipulate virtual objects and navigate through AR interfaces intuitively. The AR framework module 136 may be designed to be contextually aware, adapting the AR content based on the user's actions and the environment. For example, it may provide contextual information about objects in the user's surroundings, highlight points of interest, or offer navigation guidance. The AR framework module may also support collaborative AR experiences, enabling multiple users to interact with shared AR content in a synchronized manner. In some embodiments, The collaborative capability may be facilitated by the system's ability to track the positions and orientations of multiple devices and integrate their data into a common AR framework. In some embodiments, collaborative AR applications may include interactive gameplay, remote assistance, and shared virtual workspaces.

Further, embodiments may include a real-time processing module 138, which ensures that data from various sensors and systems is processed and integrated in real-time to enable accurate and immediate responses desirable for AR applications and other interactive functionalities. The real-time processing module 138 may be responsible for handling high-speed data fusion, maintaining low-latency communication, and ensuring the system operates efficiently and responsively. The real-time processing module 138 operates as the central hub for processing and integrating data streams from the various components of the base station 102, including the antenna module 128, SAR module 130, orientation module 132, data integration module 134, and AR framework module 136. In some embodiments, the real-time processing module 138 may continuously acquire data from multiple sources, including sensor 164 data from the user device 154, such as IMUs 168, accelerometers 166, cameras 162, and environmental data from the base station's SAR 106 and antenna 104 systems. In some embodiments, the data may include motion readings, spatial coordinates, signal patterns, and real-time images. In some embodiments, the data may undergo initial preprocessing to filter out noise and irrelevant information, which may involve signal normalization, noise reduction, and preliminary feature extraction to ensure that the data is clean and reliable for further processing. In some embodiments, the real-time processing module 138 may synchronize data from different sensors and systems to ensure temporal alignment to ensure that all data points correspond to the same time frame, providing a coherent picture of the device's state and environment. In some embodiments, the real-time processing module 138 performs sensor fusion by combining data from the IMUs 168, accelerometers 166, and cameras 162 with the spatial data from the SAR module 130. In some embodiments, advanced algorithms, such as Kalman filters and other predictive models, may be used to integrate the data, providing refined estimates of the user device's 154 position, orientation, and motion. The integrated data may then be subjected to real-time analytics to extract meaningful insights, which may involve computing device trajectories, detecting movement patterns, and identifying potential interactions with virtual objects or other devices. In some embodiments, the real-time processing module 138 may ensure low-latency communication between the base station 102 and the user device 154, which may involve optimizing data transmission protocols and utilizing efficient communication channels to minimize delay. The real-time processing module 138 may trigger events and actions within the system based on the real-time analytics. For example, the real-time processing module 138 may initiate AR content updates, adjust virtual marker placements, or activate gesture recognition functions. In some embodiments, event triggering may ensure that the system can respond dynamically to user inputs and environmental changes. In some embodiments, the real-time processing module 138 may maintain a continuous feedback loop, where processed data and system responses are fed back into the data acquisition process allowing for ongoing refinement of data processing and system performance.

Further, embodiments may include a base module 140, which initiates the scan module 142, the device module 144, the fusion module 146, the AR overlay module 148, and the collaboration module 150.

Further, embodiments may include a scan module 142, which begins by being initiated by the base module 140. The scan module 142 executes the antenna module 128 and the SAR module 130. The scan module 142 stores the data outputted by the antenna module 128 and the SAR module 130 in memory 124 and returns to the base module 140.

Further, embodiments may include a device module 144, which begins by being initiated by the base module 140. The device module 144 extracts the detected user device 154 from memory 124. The device module 144 connects to the user device 154 and receives the camera 162 and sensor 164 data. The device module 144 executes the orientation module 132 and stores the orientation data in memory 124. The device module 144 returns to the base module 140.

Further, embodiments may include a fusion module 146, which begins by being initiated by the base module 140. The fusion module 146 extracts the antenna 104, SAR 106, and user device 154 data from memory 124 and executes the data integration module 134. The fusion module 146 stores the output in memory 124 and returns to the base module 140.

Further, embodiments may include an AR overlay module 148, which begins by being initiated by the base module 140. The AR overlay module 148 executes the AR framework module 136 and sends the data to the collaboration module 150. The AR overlay module 148 returns to the base module 140.

Further, embodiments may include a collaboration module 150, which begins by being initiated by the base module 140. The collaboration module 150 receives the data from the AR overlay module 148 and sends the AR data to the user device 154 AR module 176. The collaboration module 150 returns to the base module 140.

Further, embodiments may include a cloud 152, or servers, which may serve as the central processing and storage hub, managing the vast amounts of data collected by the base station 102 equipped with phased array antennas 104. The cloud 152 infrastructure may consist of high-performance servers that provide robust computational capabilities for processing and analyzing the data transmitted from the base station 102. In some embodiments, the servers may be designed to handle the algorithms used for advanced signal processing, including angle of arrival operations, Kalman filtering, and JPDA operations. The cloud 152 performs extensive analysis to extract meaningful insights from the data received from the base station 102, which may include processing the extracted data to determine the location of target devices, filtering out outliers, and refining the tracking data to ensure accuracy. In some embodiments, the cloud 152 may leverage its high-speed computational power to run these algorithms efficiently, providing real-time feedback and updates to the base stations. In some embodiments, the cloud 152 may be responsible for storing the vast amounts of data generated by the system. In some embodiments, the cloud 152 may use advanced storage solutions to ensure that data is securely stored and easily retrievable for further analysis or historical reference.

Further, embodiments may include a user device 154 which may be a tablet, smartphone, other portable computing device, etc. The user device 154 may be used by individuals to access and interact with a software application, data, and other resources hosted on a network or server. The user device 154 may be any device that provides an interface between a user and a computer system or network. This interface may include hardware components such as a display, keyboard, and mouse or touchpad, as well as software applications that allow the user to perform tasks and access information. The user device 154 may also include built-in sensors such as cameras 162, accelerometers 166, IMUs 168, which enable the device to collect data and interact with the environment. In some embodiments, the user device 154 may also have a unique identifier or address that allows it to be recognized and tracked on a network. This identifier may be a hardware-specific identifier such as a MAC address or a software-specific identifier such as an IP address.

Further, embodiments may include a processor 156, also known as a central processing unit or CPU, which may facilitate the operation of the user device 154 according to the instructions stored in the memory 170. The processor 156 may include suitable logic, circuitry, interfaces, and/or code that may be configured to execute a set of instructions stored in the memory 170. The processor 156 may be a hardware component that performs arithmetic, logic, and control operations on data. The processor 156 may be comprised of the arithmetic logic unit, control unit, memory subsystems, and other subsystems. The processor 156 may be responsible for performing arithmetic and logical operations on data. The processor 156 may include components for addition, subtraction, multiplication, and division and logical operations such as AND, OR, and NOT. The processor 156 may be responsible for fetching instructions from memory 170, decoding them, and executing them. The processor 156 may manage the flow of data between different components of the system as a whole, ensuring that operations are performed in the correct order and that data is transferred efficiently. The processor 156 may provide fast access to frequently used data and instructions. The processor 156 may include components such as caches, registers, and pipelines, which are designed to minimize the time used to access and manipulate data. The processor 156 may include various other components and subsystems, such as instruction set architecture (ISA), which may define the set of instructions that the processor 156 can execute. The processor 156 may specify the format of instructions and data, the addressing modes used to access memory 170 and I/O devices, and the interrupt and exception handling mechanisms used to manage errors and other events. The processor 156 may include advanced instruction execution capabilities, support for virtualization and parallel processing, and power management mechanisms that reduce energy consumption and heat dissipation.

Further, embodiments may include a battery 158, such as a high-capacity lithium-ion battery, which may be designed to provide long-lasting power to support various functionalities, including advanced sensors and wireless communication modules. The battery 158 ensures that the user device 154 remains operational for extended periods, even with continuous usage of power-intensive applications such as augmented reality and real-time device tracking. The battery 158 may be optimized for fast charging, allowing users to quickly recharge their devices and minimize downtime. Safety features, including overcharge protection, temperature monitoring, and energy-efficient power management, are integrated to enhance the battery's 158 performance and longevity while ensuring user safety.

Further, embodiments may include a communication interface 160, which may be a hardware or software component that enables communication between two or more electronic devices or systems. The communication interface 160 may include a set of protocols, rules, and standards that define how information is transmitted and received between the devices. The communication interface 160 may be a physical connector, wireless network, or software application and may include components such as drivers, software libraries, and firmware that may be used to control and manage the communication process. In some embodiments, the communication interface 160 may be compatible with USB, Bluetooth, or Wi-Fi. The communication interface 160 may communicate with a network. Examples of networks may include but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN).

Further, embodiments may include a camera 162, which may be designed to enhance AR and device 154 tracking capabilities. The camera 162 may capture detailed images and videos, which are used for accurately determining the orientation and position of the device 154 in its environment. The camera 162 integrates seamlessly with the user device's 154 inertial measurement units, or IMUs 168, and accelerometers 166 to provide comprehensive data for precise spatial mapping. In some embodiments, the camera 162 may be equipped with advanced optical and digital zoom functions, enabling clear image capture even at varying distances. In some embodiments, the camera 162 may include a wide-angle lens, allowing for a broader field of view and ensuring that more of the surrounding environment is included in each frame. In some embodiments, the wide field of view allows for the AR application to create a more immersive and interactive experience by capturing more contextual information. In some embodiments, the camera 162 may include an image stabilization technology to reduce blurriness caused by user device 154 movement, such as when the user device 154 is used on the move or in dynamic environments. In some embodiments, the stabilization system works in tandem with the user device's 154 sensors 164 to provide smooth and steady visuals, enhancing both user experience and the accuracy of AR overlays. In some embodiments, the camera 162 may support low-light performance, employing advanced sensor technology and noise reduction algorithms to capture clear and detailed images in various lighting conditions. In some embodiments, the low-light performance feature may ensure that the device can function effectively in different environments, from brightly lit outdoor settings to dimly lit indoor areas.

Further, embodiments may include a plurality of sensors 164 in the user device 154, which may contribute to the device's 154 ability to interact intelligently with its environment and provide an enhanced user experience. In some embodiments, the sensors 164 may include accelerometers 166, IMUs 168, cameras 162, proximity sensors, ambient light sensors, and microphones, among others. In some embodiments, the accelerometer 166 may measure linear acceleration forces along the X, Y, and Z axes and detect changes in velocity due to gravity, movement, or vibrations, allowing the system to understand the user device's 154 translational movements such as tilting, shaking, or moving from one place to another. In some embodiments, inertial measurement units, or IMUs 168, may integrate accelerometers 166, gyroscopes, and magnetometers to provide comprehensive data on the user device's 154 motion and orientation. In some embodiments, gyroscopes may measure the rate of rotation around the X, Y, and Z axes, detecting angular velocity to track rotational movements and maintain orientation. In some embodiments, magnetometers may measure the strength and direction of the magnetic field, helping to determine the user device's 154 orientation relative to the Earth's magnetic field. In some embodiments, the camera 162 may capture high-resolution images and videos. The camera 162 may support functionalities such as facial recognition, gesture recognition, and augmented reality experiences. The camera 162 may capture images of the user holding the user device 154, which may be analyzed to determine the device's facing direction and identify obstructions like the user's body, ensuring an accurate assessment of the field of view. In some embodiments, the user device 154 may include other sensors such as GPS for location tracking, barometers for altitude measurement, and biometric sensors for fingerprint or facial recognition.

Further, embodiments may include an accelerometer 166, which may be a highly sensitive and precise sensor that measures the acceleration forces acting on the user device 154. In some embodiments, the forces may be static, like the constant force of gravity, or dynamic, caused by the movement or vibrations of the user device 154. In some embodiments, the accelerometer 166 data may allow the base station 102 to determine the user device's 154 orientation, motion, and overall spatial dynamics. In some embodiments, the accelerometer 166 may continuously monitor the three-dimensional movement of the user device 154 along the X, Y, and Z axes. The accelerometer 166 allows the user device 154 to detect changes in speed and direction, providing vital data for various applications, particularly in AR and device tracking systems. In some embodiments, the accelerometer 166 helps determine the precise movement of the user device 154 in real-time by measuring the rate of change in velocity. In some embodiments, the accelerometer 166 provides a comprehensive understanding of the user device's 154 orientation and motion, along with the camera 162 data and IMU 168 data. For example, when the user device 154 is moved or tilted, the accelerometer 166 detects these changes and communicates them to the system's processing unit. In some embodiments, the accelerometer 166 data may be fused with information from other sensors 164, such as the gyroscope and magnetometer, to accurately calculate the user device's 154 position and orientation. In some embodiments, the accelerometer 166 may contribute to gesture recognition capabilities. By analyzing the patterns and intensity of movements, the user device 154 may interpret various gestures made by the user.

Further, embodiments may include an IMU 168, or inertial measurement unit, which may assist in accurately determining the user device's 154 orientation, position, and motion. In some embodiments, the IMU 168 may combine accelerometers 166, gyroscopes, and magnetometers to provide a comprehensive set of data on the user device's 154 dynamic behavior in three-dimensional space. In some embodiments, the accelerometers 166 within the IMU 168 may measure linear acceleration forces along the X, Y, and Z axes, and these forces may be due to gravity, movement, or vibrations. By detecting changes in velocity, the accelerometers 166 help determine the speed and direction of the user device's 154 motion. In some embodiments, gyroscopes in the IMU 168 may measure the rate of rotation around the X, Y, and Z axes. In some embodiments, the gyroscopes may detect angular velocity, which is used for tracking rotational movements and maintaining orientation. In some embodiments, the gyroscope's ability to measure how fast and in which direction the user device 154 is rotating allows the system to accurately track changes in the device's orientation over time. In some embodiments, the magnetometers in the IMU 168 may measure the strength and direction of the magnetic field around the device, which helps determine the user device's 154 orientation relative to the Earth's magnetic field, providing compass-like functionality. In some embodiments, by integrating data from the magnetometer with the accelerometer 166 and gyroscope, the IMU 168 may correct for any drift or errors in the orientation measurements, ensuring high accuracy.

Further, embodiments may include a memory 170, which may store data collected by the user device 154, such as sensor data, analysis of data, etc. In one embodiment, the memory 170 may include suitable logic, circuitry, and/or interfaces that may be configured to store a machine code and/or a computer program with at least one code section executable by the processor 156. Examples of implementation of the memory 170 may include, but are not limited to, Random Access Memory (RAM), Read Only Memory (ROM), Hard Disk Drive (HDD), and/or a Secure Digital (SD) card.

Further, embodiments may include an application 172 on the user device 154, which may enable a seamless connection between the device 154 and the base station's 102 capabilities. In some embodiments, the application 172 may be designed to facilitate various operations, including authentication, tracking, payment processing, and augmented reality interactions. In some embodiments, the application 172 may be equipped with electronic tag support, which allows the user device 154 to function as an active tag within the base station 102 system. This feature enables the user device 154 to emit signals at specified intervals, thereby allowing the base station 102 to accurately detect, track, and interact with it. Through bidirectional communication, the user device 154 may receive commands and transmit data back to the base station 102, facilitating real-time updates and interactions. In some embodiments, the application 172 may include the generation and management of cryptographic keys, which may be used for secure communications between the user device 154 and the base station 102. In some embodiments, public and private keys may be used to encrypt data transmissions, safeguarding the integrity and confidentiality of the information exchanged. In some embodiments, the application 172 may support authentication and user verification processes. The application 172 allows for multi-factor authentication, combining something the user has, such as the device itself, something the user knows, such as a password or PIN, and something the user is, such as biometric data, such as fingerprints or facial recognition. In some embodiments, the application 172 may support payments and transactions, which enable the user device 154 to facilitate automated payments and transactions within predefined zones, such as retail environments. For example, when the user device 154 enters a designated payment area, it can initiate a secure transaction process, verifying the user's identity and completing the purchase with minimal user intervention. In some embodiments, the application 172 may include automatic Wi-Fi connection logic to facilitate seamless connectivity allowing the user device 154 to automatically connect to known Wi-Fi networks within the environment, ensuring continuous communication with the base station 102. In some embodiments, the application 172 may support dynamic branding and content delivery, enabling third parties, such as retailers or service providers, to push customized content to the user's device 154 based on its location within the system. For example, a store may send promotional offers, navigation aids, or product information directly to the user's device 154 as they move through the store. In some embodiments, the application 172 may integrate with various sensors on the user device 154, including cameras 162, IMUs 168, accelerometers 166, and more. The sensors 164 collect data that the application processes and transmits to the base station 102, enhancing the system's overall functionality. For example, the camera 162 may capture images for AR applications, while the IMUs 168 and accelerometers 166 provide detailed motion and orientation data.

Further, embodiments may include a sensor module 174, which may be continuously polling for a connection with the base station 102. The sensor module 174 facilitates data transfer between the user device 154 and the base station 102. The sensor module 174 sends camera 162 and sensor data 164, including visual information from the camera 162, motion and orientation data from accelerometers 166 and IMUs 168, and other environmental metrics. In some embodiments, the data transfer may be continuous and real-time, allowing the base station 102 to receive the latest information for accurate AR rendering and integration. The sensor module 176 then initiates the AR module 176, which processes the received AR data to update the user's AR experience.

Further, embodiments may include an AR module 176, which may be initiated by the sensor module 174 and begins by receiving AR data from the collaboration module 150. The AR data may include visual overlays, interactive elements, and contextual information that are used for rendering virtual objects over the real-world view captured by the device's camera 162. The AR module 176 then updates the AR experience through the application 172, utilizing the device's sensors 164, such as IMUs 168 and accelerometers 166, to accurately track movement and orientation to ensure that the virtual elements are correctly positioned and responsive to user interactions. In some embodiments, the process may be designed to be continuous, allowing for dynamic updates as the user interacts with the AR environment. The AR module 176 returns to the sensor module 174.

Figure 2:
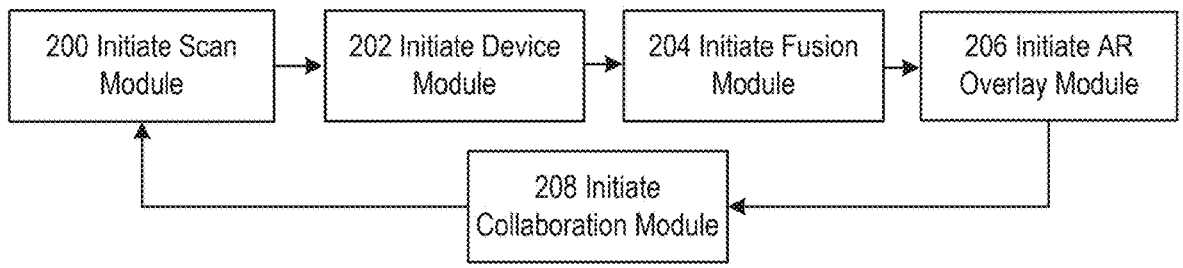
FIG. 2 is a flow chart of a method performed by a Base Module according to an embodiment.

FIG. 2 illustrates the base module 140. The process begins with the base module 140 initiating, at step 200, the scan module 142. The scan module 142 begins by being initiated by the base module 140. The scan module 142 executes the antenna module 128 and the SAR module 130. The scan module 142 stores the data outputted by the antenna module 128 and the SAR module 130 in memory 124 and returns to the base module 140. The base module 140 initiates, at step 202, the device module 144. The device module 144 begins by being initiated by the base module 140. The device module 144 extracts the detected user device 154 from memory 124. The device module 144 connects to the user device 154 and receives the camera 162 and sensor 164 data. The device module 144 executes the orientation module 132 and stores the orientation data in memory 124. The device module 144 returns to the base module 140. The base module 140 initiates, at step 204, the fusion module 146. The fusion module 146 begins by being initiated by the base module 140. The fusion module 146 extracts the antenna 104, SAR 106, and user device 154 data from memory 124 and executes the data integration module 134. The fusion module 146 stores the output in memory 124 and returns to the base module 140. The base module 140 initiates, at step 206, the AR overlay module 148. The AR overlay module 148 begins by being initiated by the base module 140. The AR overlay module 148 executes the AR framework module 136 and sends the data to the collaboration module 150. The AR overlay module 148 returns to the base module 140. The base module 140 initiates, at step 208, the collaboration module 150. The collaboration module 150 begins by being initiated by the base module 140. The collaboration module 150 receives the data from the AR overlay module 148 and sends the AR data to the user device 154 AR module 176. The collaboration module 150 returns to the base module 140.

Figure 3:
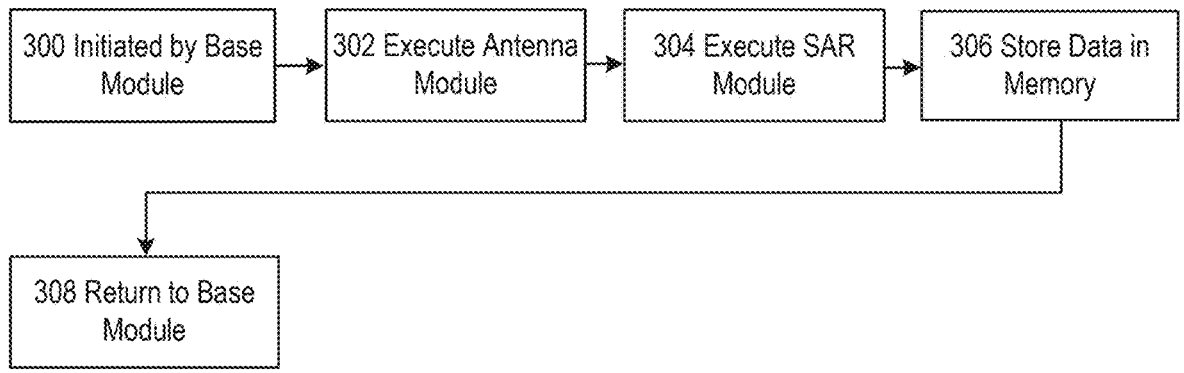
FIG. 3 is a flow chart of a method performed by a Scan Module according to an embodiment.

FIG. 3 illustrates the scan module 142. The process begins with the scan module 142 being initiated at step 300 by the base module 140. The scan module 142 executes, at step 302, the antenna module 128. The antenna module 128 enables both passive and active detection of user devices 154. In passive mode, the antenna module 128 operates by listening to all wireless traffic within its vicinity without transmitting any signals. The passive approach allows the base station 102 to capture signals emitted by user devices 154, such as Wi-Fi and Bluetooth signals, without interacting with the devices being monitored. The phased array antenna 104, equipped with multiple elements, detects these signals and uses advanced signal processing techniques to determine the exact position of the devices. By analyzing the angle of arrival, or AoA, and signal strength, the antenna module 128 may triangulate the precise coordinates of the devices within the environment. The passive detection capability allows for discreet monitoring, reducing the likelihood of detection by the tracked devices and avoiding interference with their operations. In active mode, the antenna module 128 switches from only listening to also transmitting signals. The active mode may be used when more dynamic interaction with the environment is desirable. The phased array antenna 104 transmits signals, which then reflect off objects and devices in the environment. By receiving the reflected signals, the system can perform detailed analysis to understand the surroundings better. The active mode process may involve measuring the time delay and frequency shift of the reflected signals to calculate distances and movements. The active mode enhances the base station's 102 ability to track device movements more dynamically. The antenna module's 128 phased array design supports both passive and active operations efficiently. The antenna elements may electronically steer the radar beam to focus on specific areas, improving the accuracy of detection and tracking. In passive mode, this beam steering helps in better-capturing signals from various angles, enhancing the triangulation process. In active mode, it ensures that the transmitted signals cover a wide area and the reflected signals are accurately received and processed. In some embodiments, the antenna module 128 may include null space reduction techniques to identify and minimize dead zones in the signal reception pattern to ensure clear signal reception and reduce interference to maintain high accuracy in both passive and active modes. In some embodiments, the antenna module 128 may also utilize Kalman filters for prediction and smoothing of device positions and the Joint Probabilistic Data Association, or JPDA, for accurate data association in environments with multiple devices.

In some embodiments, the antenna module 128 uses the MUSIC (Multiple Signal Classification) algorithm. MUSIC utilizes the eigenvalues and eigenvectors of the covariance matrix of the received signal to estimate AoA with high resolution by searching for peaks in the spatial spectrum. To address complex environments, a Multiple Signal Classification (MUSIC) algorithm can be used. In signal processing problems, the objective is to estimate from past measurements or expectations of measurements from a set of constant values upon which the received signals depend.

In an embodiment, in order to solve the multipath problem for high accuracy tracking, the MUSIC algorithm is used to estimate the AoA of one or more signals arriving at the antenna array. The MUSIC algorithm uses an eigenspace method to determine and express the phase shift between the antennas as a complex exponential.

$$\Phi(\theta) = e^{-j2\pi \sin(d)/\lambda}$$

$$\vec{a}(\theta) = [1 \, \Phi(\theta) \, \Phi(\theta)^2 \, \ldots \, \Phi(\theta)^{M-1}]$$

As shown above in the equation, the phase shift of an incoming signal F(q) is determined as a function of the distance between two antennas, d, and the wavelength of the signal 1. The vector a(0) represents an overall direction in which the antenna array will form a beam, wherein each element of the vector represents an individual multipath signal. For M number of antennas in the array, the vector a (q) includes M−1 processed signals. Due to the delay in transmission across the array, the vector a (q) may be used by the tracking system to steer a signal in the direction of the vector or to indicate that an incoming signal is received from the direction of the vector. The correlation matrix of an incoming signal x is given as Rxx, where eigenvectors of Rxx corresponding to its smallest eigenvalues are orthogonal to the steering vectors. Mathematically, this is done by evaluating the MUSIC spectrum according to the equation:

$$P_{MU}(\theta) = \frac{1}{\vec{a}(\theta)^H E_N E_N^H \vec{a}(\theta)}$$

In the above equation, H denotes the Hermitian self-adjoint matrix as a complex square matrix. EN is a matrix whose columns are the eigenvectors of Rxx corresponding eigenvalues smaller than a threshold value. Systems using the MUSIC algorithm to determine AoA for incoming signals typically need more antennas than propagation paths to resolve the incoming signals correctly. For example, the MUSIC algorithm resolves up to M−1 different signal paths (e.g., in the case of 3 antennas in the array, only 2 multipath signals can be differentiated). In one embodiment, the system overcomes the limitation of resolving M−1 signal paths by implementing multiple antennas, linked but not collocated, such that an interlinked mesh network processes signals received by the antennas as a fleet. Multiple sensors compute signal paths and the interlinked mesh network determines a true origin of the signal based on the computed paths to perform distributed spatial smoothing. Antennas may be selected or spaced for any number of multipath signals. For example, in high-frequency applications, the spacing of antenna elements can be selected based on the wavelength of multipath signals. Additionally, antennas rated for a high number of multipath signal can be larger than antennas rated for a lower number of multipath signals. In one embodiment, the antenna array includes one or more antenna with fewer antenna elements, and the interlinked mesh network is used to collect, process, and resolve data collected by the antenna array.

For another example, the antenna module 128 may use Estimation of Signal Parameters via Rotational Invariance Techniques (ESPRIT). ESPRIT analyzes the rotational invariance properties of the signal subspace to estimate AoA, providing high accuracy with reduced computational complexity compared to MUSIC.

In addition, or alternatively, the antenna module 128 may use received signal strength to perform trilateration. Trilateration is an alternative method of determining the position of a signal source by calculating the distances between the source and multiple receiving antennas. Distance estimation can be performed using the AoA data, where known positions of the antennas and the angles of the incoming signal are used to infer the distance. However, a more direct and sometimes more precise method may involve deriving the distance from the difference in signal strength received at two or more antennas. The principle behind this method is based on the inverse relationship between signal strength and distance. As the distance from the signal source to the antenna increases, the signal strength decreases, typically following an inverse-square law or a similar attenuation model depending on the environment. In scenarios where trilateration is implemented, the antenna module 128 may require at least three antennas to determine the exact location of the signal source. The use of three antennas allows the formation of three independent distance equations, which, when solved simultaneously, may provide a unique intersection point corresponding to the location of the signal source. The received signal strength at each antenna may provide the basis for calculating the respective distances. For example, if the signal at one antenna is stronger by a known percentage compared to another, the ratio of these signal strengths can be used to infer the ratio of the distances. By combining this information with the known physical separation between the antennas, the system can establish a set of nonlinear equations representing the distances from the source to each antenna. The solution involves finding the point where the calculated distances (based on signal strength differences) intersect, which represents the most likely location of the signal source relative to the antenna array. Furthermore, the accuracy of trilateration can be enhanced by incorporating additional antennas, which provide more distance measurements and, consequently, reduce the uncertainty in the position estimate. The use of more antennas allows for the implementation of overdetermined systems, where the additional data can be used to minimize errors and improve the robustness of the location estimation process. Trilateration is particularly advantageous in environments where the AoA measurement might be challenging due to multipath propagation or other interference effects that distort the apparent AoA. Trilateration may be used in place of or in conjunction with triangulation.

The scan module 142 executes, at step 304, the SAR module 130. The SAR module 130 may create detailed spatial maps and accurately detect the positions of devices in the environment. The SAR module 130 leverages Synthetic Aperture Radar, or SAR, technology integrated with a phased array antenna 104 to achieve high-resolution 3D mapping and precise device tracking. The SAR module 130 may transmit microwave radar signals towards the target area. These signals, once emitted from the SAR 106 system, travel through the environment, interacting with various objects and surfaces. The signals then reflect to the SAR 106 antenna 104, carrying valuable information about the distance and movement of the objects they encountered. The phased array antenna 104 includes multiple antenna elements that may be electronically steered to direct the radar beam in different directions without physically moving the antenna 104, allowing for efficient scanning of the environment and improving the resolution and accuracy of the data collected. For example, the SAR 106 system initiates the process by transmitting radar signals towards the target area. The phased array antenna 104 emits these signals, which are designed to cover a broad spatial area to capture comprehensive data. As the radar signals travel through the environment, they encounter various objects and surfaces, reflecting to the antenna 104. The characteristics of these reflected signals, such as time delay and frequency shift, provide information about the objects' distance and movement. The SAR 106 system, with the phased array antenna 104, collects the reflected signals from multiple positions. In some embodiments, the phased array antenna's 104 ability to electronically steer the radar beam may allow it to gather data from different angles and perspectives, effectively simulating a larger antenna and improving the resolution of the collected data. The collected data undergoes signal processing algorithms that combine the multiple radar reflections into a coherent image, correcting for any motion of the radar platform and extracting detailed spatial information, resulting in a high-resolution 3D map that accurately represents the environment. The processed data is used to generate a 3D map, providing a detailed spatial representation of the surroundings. In some embodiments, the map may include precise information about the positions and movements of objects within the scanned area. In some embodiments, the system may accurately determine the position of user devices 154 by using the 3D map and additional sensor 164 data. The scan module 142 stores, at step 306, the data outputted by the antenna module 128 and the SAR module 130 in memory 124. The output generated by the antenna module 128 and the SAR module 130 may consist of highly detailed spatial and signal data, including precise location coordinates, signal strength, AoA measurements, and Doppler shift calculations, which together provide a comprehensive view of the physical environment and the positions of various wireless devices within it. In some embodiments, the data from the antenna module 128 may capture the passive detection of signals emitted by devices, encompassing information such as device identifiers, signal intensity, and trajectory estimates, which allows for tracking the movement and identifying the behavior of these devices without requiring active engagement or interaction. In some embodiments, the SAR module's 130 output may include high-resolution three-dimensional maps constructed from radar signals reflected off objects in the environment. The maps may feature fine-grained details of the surroundings, such as structural outlines, potential obstructions, and the spatial arrangement of elements within the scanned area. In some embodiments, the SAR 106 data may also contain metadata related to the timing, frequency, and phase of the radar signals to process and interpret the spatial data accurately. In some embodiments, the stored data may be used by other system components for further processing, such as the data integration module 134 and the real-time processing module 138, enabling precise placement of virtual objects and enhancing interactive features. The scan module 142 returns, at step 308, to the base module 140.

Figure 4:
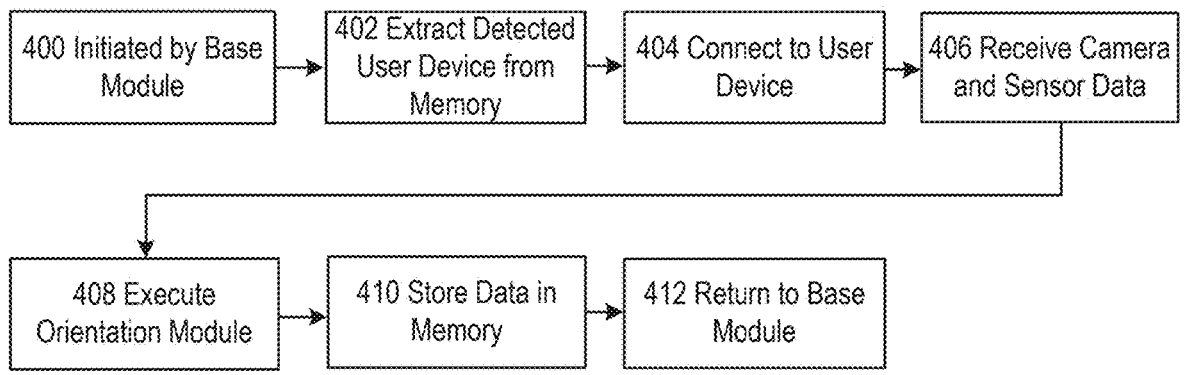
FIG. 4 is a flow chart of a method performed by a Device Module according to an embodiment.

FIG. 4 illustrates the device module 144. The process begins with the device module 144 being initiated at step 400 by the base module 140. The device module 144 extracts, at step 402, the detected user device 154 from memory 124. The device module 144 extracts the details of the detected user device 154 from the base station's 102 memory 124, which may involve retrieving stored information such as the user device's 154 unique identifier, previous connection history, and any pre-existing data associated with it. In some embodiments, the extracted data may be used to identify the specific user device 154 the module will connect to, ensuring accurate targeting and interaction. The device module 144 connects, at step 404, to the user device 154. The device module 144 sets up a communication link using available wireless protocols, such as Wi-Fi or Bluetooth. It may include authentication steps to verify the user device's 154 identity and ensure secure communication. The device module 144 receives, at step 406, the camera 162 and sensor 164 data. The device module 144 receives data from the user device's 154 camera 162 and other sensors 164, which includes visual information captured by the camera 162, as well as measurements from sensors such as IMUs 168, accelerometers 166, gyroscopes, and other environmental sensors. In some embodiments, the received data may be used to determine the user device's 154 position, movement, and orientation within the environment. The device module 144 executes, at step 408, the orientation module 132. The orientation module 132 may be responsible for accurately determining the orientation of user devices 154. The orientation module 132 may integrate data from various sensors 164 from the user device 154 to provide precise spatial context and ensure real-time interaction within the augmented reality framework. In some embodiments, the orientation module 132 may collect and use data from the user device's 154 IMU 168, accelerometers 166, camera 162, etc., to determine position and orientation. For example, the data from the user device 154 may be continuously collected, such as from the user device's 154 IMUs 168 and accelerometers 166. In some embodiments, the IMUs 168 may include a combination of gyroscopes and accelerometers 166, which measure angular velocity and linear acceleration, respectively, and provide information about the device's motion and orientation changes. In some embodiments, the orientation module 132 may employ sensor fusion algorithms to combine data from the IMUs 168 and accelerometers 166. For example, sensor fusion may integrate multiple sources of information to mitigate the limitations of individual sensors, resulting in a more reliable and robust determination of the device's orientation. In some embodiments, the user device's 154 camera 162 may capture images of the user holding the device, and the images may be analyzed to understand the user's interaction with the device and to identify any obstructions, such as the user's body, which might affect the orientation determination. In some embodiments, the orientation module 132 may apply algorithms to analyze the signal patterns from the IMUs 168, accelerometers 166, and the SAR 106 system. In some embodiments, the analysis may include identifying the user device's 154 facing direction and understanding its orientation relative to the surrounding environment. In some embodiments, the SAR 106 system may assist in mapping the environment and providing spatial references that enhance the orientation accuracy. The orientation module 132 may identify obstructions that might impact the field of view of the device's camera 162 by combining the visual data from the camera 162 and the signal patterns. For example, if the user's body is blocking part of the view, the system can account for this in its calculations. The orientation module 132 may determine the precise orientation of the user device 154 by utilizing the fused sensor data, image analysis, and obstruction information, including calculating the user device's 154 pitch, roll, and yaw angles, which describe its rotation in three-dimensional space. In some embodiments, the orientation module 132 may continuously update the orientation information in real time, ensuring that any changes in the user device's 154 position or movement are promptly reflected. In some embodiments, the determined orientation data may be integrated into the augmented reality framework, enabling precise placement of virtual markers and enhancing gesture-based interfaces to ensure that the virtual objects appear correctly aligned with the real world, providing an immersive and interactive user experience. For example, a tourist in a city may use an AR navigation application 172 on their user device 154 to explore local landmarks. As the user holds up their device and points the camera 162 in different directions, the orientation module utilizes the device's sensors 164, such as accelerometers 166, gyroscopes, and magnetometers, to accurately determine the device's 154 orientation in three dimensions, including the pitch, roll, and yaw. The system has previously created a detailed 3D map of the area, including buildings, landmarks, and other structures. The 3D map may be stored in the system's memory 124 and may be used by the AR application 172 to provide precise context. When the tourist points their user device's 154 camera 162 towards a famous building, the orientation module 134 may detect the exact direction the camera 162 is facing and its inclination. In some embodiments, this data may be combined with the device's 154 GPS coordinates and the 3D map, allowing the app 172 to overlay relevant information directly onto the live camera 162 feed with high accuracy. For example, when the user points the camera 162 at a landmark, the AR system references the 3D map to identify the exact building in view. In some embodiments, the app 172 might display virtual markers such as the building's name, historical details, and notable facts about its architecture precisely aligned with the actual structure. The device module 144 stores, at step 410, the orientation data in memory 124. The device module 144 stores the processed orientation data in the system's memory 124, which may involve saving both the raw sensor 164 data and the processed orientation information. In some embodiments, the stored data may be accessed by other system modules for tasks such as real-time tracking, historical analysis, and predictive modeling. The device module 144 returns, at step 412, to the base module 140.

Figure 5:
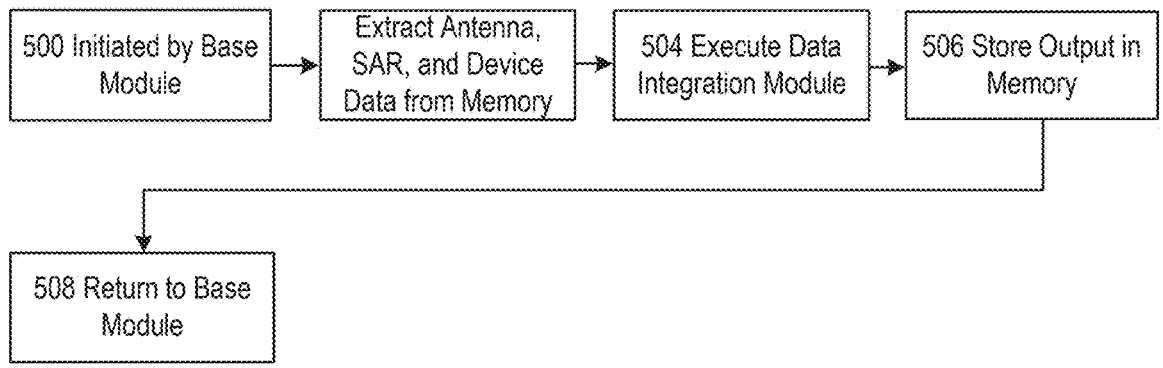
FIG. 5 is a flow chart of a method performed by a Fusion Module according to an embodiment.

FIG. 5 illustrates the fusion module 146. The process begins with the fusion module 146 being initiated at step 500 by the base module 140. The fusion module 146 extracts, at step 502, the antenna 104, SAR 106, and user device 154 data from memory 124. In some embodiments, the data may include signal strength and patterns from the antenna 104, high-resolution spatial data from the SAR 106, and positional and orientation data from the user device 154. The fusion module 146 executes, at step 504, the data integration module 134. The data integration module 134 integrates data from various sources to create a comprehensive spatial understanding of the environment and the devices within it. The data integration module 134 may integrate sensor 164 data, SAR 106 generated 3D maps, and user device 154 position information to ensure accurate and seamless augmented reality experiences. In some embodiments, the data integration module 134 may be designed to combine and process data from multiple sources to generate a detailed and accurate spatial representation of the environment. The data integration module 134 may involve generating a 3D map of the environment using data from the SAR 106 system. In some embodiments, the SAR 106 system scans the surroundings. It captures high-resolution spatial data, which is processed to create a detailed 3D map, which includes information about the physical structures, objects, and other elements within the area. The data integration module 134 may receive data about the user's position and the user device's 154 position from the antenna module 128 and other sensors, including the precise coordinates of the user device 154 and its orientation. In some embodiments, the data integration module 134 may provide a real-time view of where the user and the user device 154 are located within the mapped environment by overlaying this position information onto the 3D map. The data integration module 134 may continuously collect sensor data from the device's IMUs 168, accelerometers 166, and cameras 162. The sensor data may be integrated with the 3D map and position information to provide a comprehensive understanding of the device's state and its interaction with the environment. The data integration module 134 may employ algorithms to analyze signal patterns from various sensors, including SAR 106, IMUs 168, and accelerometers 166. In some embodiments, the algorithms may detect and interpret the user device's 154 movements and orientation changes, ensuring that the integrated data accurately reflects the device's state. In some embodiments, the data integration module 134 may identify any obstructions, such as the user's body or other objects, that might affect the user device's 154 field of view or signal reception by analyzing the integrated sensor data and the 3D map. The data integration module 134 may adjust the data accordingly to ensure that these obstructions are accounted for, maintaining the accuracy of the spatial representation. In some embodiments, the data integration module 134 may operate in real-time and continuously update the spatial representation as new sensor data is received. The data integration module 134 enables precise placement of AR content within the 3D map using the integrated and processed data. In some embodiments, virtual markers, objects, and interfaces may be accurately positioned based on the user device's 154 location and orientation, ensuring that the AR content aligns correctly with the real-world view. The data integration module 134 may support enhanced gesture-based interfaces by providing accurate spatial data. In some embodiments, users may interact with virtual markers and AR content using natural hand movements. In some embodiments, the system may recognize gestures such as tapping, swiping, pinching, and dragging, allowing users to manipulate virtual objects and navigate through AR interfaces intuitively. The fusion module 146 stores, at step 506, the output in memory 124. The output may include a detailed, integrated dataset that represents the current state of the system's environment and the user's interactions. The stored data may be used for various applications, such as generating augmented reality overlays, enhancing user interface responsiveness, or conducting further analysis and research. The fusion module 146 returns, at step 508, to the base module 140.

Figure 6:
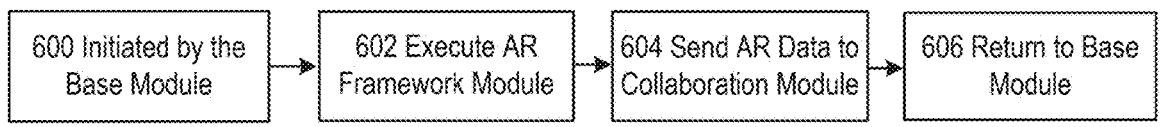
FIG. 6 is a flow chart of a method performed by an AR Overlay Module according to an embodiment.

FIG. 6 illustrates the AR overlay module 148. The process begins with the AR overlay module 148 being initiated at step 600 by the base module 140. The AR overlay module 148 executes, at step 602, the AR framework module 136. The AR framework module 136 may be responsible for enabling augmented reality, or AR, interactions by leveraging data from various sensors and integrating it with computer vision and signal processing techniques. The AR framework module 136 may provide the foundation for creating immersive and interactive AR experiences. For example, the AR framework module 136 orchestrates the seamless integration of real-world data and virtual content, facilitating a range of applications from interactive gameplay to navigation aids and informational overlays. In some embodiments, the AR framework module 136 utilizes sensor data, computer vision algorithms, and real-time processing capabilities to deliver accurate and responsive AR interactions. The AR framework module 136 may begin by collecting data from the user device's 154 cameras 162, IMUs 168, and accelerometers 166. In some embodiments, the cameras 162 may capture images of the environment, the IMUs 168 and accelerometers 166 may provide information about the user device's 154 motion and orientation. The AR framework module 136 may employ computer vision algorithms to process the camera images once the data is collected. In some embodiments, the algorithms analyze the images to detect specific features, such as edges, corners, and textures, that are used for understanding the environment and identifying objects. In some embodiments, the computer vision algorithms may also track the user's hand and body positions, providing additional context for positioning and orientation. The AR framework module 136 may continuously refine the user device's 154 position and orientation by combining the sensor data with the computer vision analysis. In some embodiments, the fusion of data ensures that the user device's 154 location is accurately determined, even in dynamic environments. The refined position and orientation data are then used to align the AR content correctly with the real-world view. The AR framework module 136 places virtual markers within the 3D map created by the data integration module 134 with accurate position and orientation information. In some embodiments, the markers may represent interactive objects, navigation points, or informational overlays. In some embodiments, the placement of the virtual markers is precise to ensure that they align correctly with real-world objects and surfaces. The AR framework module 136 renders the AR content in real-time, overlaying it onto the live camera 162 feed. The real-time rendering capability allows users to see and interact with virtual objects as if they were part of the real world. In some embodiments, the rendering process may take into account the lighting conditions, occlusions, and other factors to enhance the realism of the AR content. The AR framework module 136 may support enhanced gesture-based interfaces, allowing users to interact with virtual markers and AR content using natural hand movements. In some embodiments, gesture recognition algorithms may detect gestures such as tapping, swiping, pinching, and dragging, enabling users to manipulate virtual objects and navigate through AR interfaces intuitively. The AR framework module 136 may be designed to be contextually aware, adapting the AR content based on the user's actions and the environment. For example, it may provide contextual information about objects in the user's surroundings, highlight points of interest, or offer navigation guidance. The AR framework module may also support collaborative AR experiences, enabling multiple users to interact with shared AR content in a synchronized manner. In some embodiments, The collaborative capability may be facilitated by the system's ability to track the positions and orientations of multiple devices and integrate their data into a common AR framework. In some embodiments, collaborative AR applications may include interactive gameplay, remote assistance, and shared virtual workspaces. For example, virtual markers within the AR framework module 136 may be used for a shopping experience by providing detailed information and interactive elements overlaid on real-world objects. For instance, in a retail clothing store, these virtual markers may be used to enhance product displays. As a shopper walks through the store with their AR-enabled device 154, they can point their camera 162 at various items, such as clothing racks or individual garments. The AR framework module, using virtual markers, may display overlaid information on the device's screen, such as product information, color and style options, customer reviews, promotional offers, size guide and fit suggestions, virtual try-on, inventory availability, etc. In some embodiments, when the camera 162 is pointed at a specific garment, a virtual tag could appear, displaying details like fabric composition, available sizes, price, and care instructions. In some embodiments, for items like clothing or accessories, virtual markers may show available color options and styles. For example, pointing at a red dress might bring up thumbnails of the dress in blue, black, and white, which the user can select to visualize. In some embodiments, virtual markers could also display customer reviews and ratings, providing instant feedback from other shoppers about the product's quality and fit. In some embodiments, special deals and promotions may be highlighted using virtual markers. If a user points their device 154 at a product that's part of a sale, the AR overlay may display a discount badge and additional details, like "Buy One Get One 50% Off." In some embodiments, for fashion retail, virtual markers can provide a size guide and fit suggestions based on the shopper's measurements, and this feature may use the device's 154 camera 162 to scan the shopper's body and recommend the best size to purchase. In some embodiments, virtual markers may enable virtual try-on features, where shoppers can see how a piece of clothing might look on them without physically trying it on, such as for accessories like glasses, hats, or jewelry. In some embodiments, virtual markers may also indicate inventory status, such as whether an item is in stock, low on stock, or available for order online. For example, a shopper in a store uses their smartphone's AR app to look at a pair of sneakers. As they do, the screen shows the sneakers with virtual tags that display the shoe's size availability, price, customer reviews, and a button for a "try it on" feature, which overlays the shoes on a live feed of the shopper's feet. Additionally, a banner might appear, indicating a special promotion if purchased with another item. The AR overlay module 148 sends, at step 604, the data to the collaboration module 150. The data may include the positions, movements, and interactions of virtual objects within the AR environment, as well as any relevant user actions or inputs. In some embodiments, the collaboration module 150 may use the data to facilitate real-time interactions between multiple users, allowing them to share the same AR experience, collaborate on tasks, or engage in shared activities. The AR overlay module 148 returns, at step 606, to the base module 140.

Figure 7:
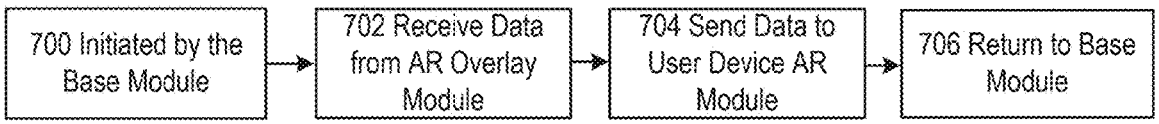
FIG. 7 is a flow chart of a method performed by a Collaboration Module according to an embodiment.

FIG. 7 illustrates the collaboration module 150. The process begins with the collaboration module 150 being initiated at step 700 by the base module 140. The collaboration module 150 receives, at step 702, the data from the AR overlay module 148. The data may include detailed information about the virtual objects and interactions within the AR environment, such as object positions, movements, user actions, and any other relevant context. The data may also include the visual and spatial elements that need to be rendered on the user devices 154. The collaboration module 150 sends, at step 704, the AR data to the user device 154 AR module 176. In some embodiments, the data transmission may be designed to be efficient and real-time, minimizing latency and ensuring a smooth and synchronized AR experience. The AR module 176 on the user device 154 may use the data to update the visual display, allowing users to see and interact with the AR elements as intended. In some embodiments, the data may allow for collaborative actions, such as shared object manipulation or communication, which may be accurately reflected across all devices. The collaboration module 150 returns, at step 706, to the base module 140.

Figure 8:
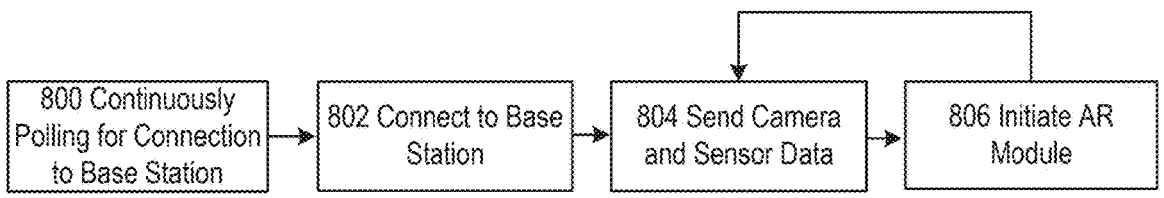
FIG. 8 is a flow chart of a method performed by a Sensor Module according to an embodiment.

FIG. 8 illustrates the sensor module 174. The process begins with the sensor module 174 continuously polling at step 800 for a connection to the base station 102. In some embodiments, the sensor module 174 may actively search for a communication link with the base station 102 to ensure that the user device 154 is ready to transmit data as soon as a stable connection is established. The polling process is continuous, in which the sensor module 174 constantly checks for the availability of the base station's 102 signal and allows to maintenance of real-time data transmission that may assist with the accurate functioning of the AR environment. The sensor module 174 connects, at step 802, to the base station 102. In some embodiments, the connection may allow for the transfer of data between the user device 154 and the base station 102, enabling the system to utilize the data collected by the user device's 154 sensors 164. In some embodiments, the connection may be achieved through the active mode of the phased array antenna 104. The sensor module 174 sends, at step 804, the camera 162 and sensor 164 data. The data may include visual information from the camera 162, motion and orientation data from accelerometers 166 and IMUs 168, and other environmental data such as ambient light or temperature. In some embodiments, the transmission of this data may be continuous and real-time to ensure that the base station 102 receives the most current information, which is needed for the AR system to accurately position and render virtual objects, track user movements, and integrate real-world and virtual environments seamlessly. The sensor module 174 initiates, at step 806, the AR module 176, and the process returns to sending the camera 162 and sensor 164 data. The AR module 176 is initiated by the sensor module 174 and begins by receiving AR data from the collaboration module 150. The AR data may include visual overlays, interactive elements, and contextual information that are used for rendering virtual objects over the real-world view captured by the device's camera 162. The AR module 176 then updates the AR experience through the application 172, utilizing the device's sensors 164, such as IMUs 168 and accelerometers 166, to accurately track movement and orientation to ensure that the virtual elements are correctly positioned and responsive to user interactions. In some embodiments, the process may be designed to be continuous, allowing for dynamic updates as the user interacts with the AR environment. The AR module 176 returns to the sensor module 174.

Figure 9:
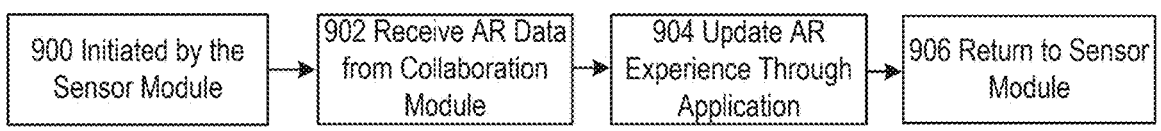
FIG. 9 is a flow chart of a method performed by an AR Module according to an embodiment.

FIG. 9 illustrates the AR module 176. The process begins with the AR module 176 being initiated at step 900 by the sensor module 174. The AR module 176 receives, at step 902, the AR data from the collaboration module 150. The data may include visual overlays, interactive elements, and contextual information relevant to the user's environment and activities and contains the information for the AR module 176 to render and display virtual objects accurately over the real-world view captured by the device's camera 162. The AR module 176 updates, at step 904, the AR experience through the application 172. The AR module 176 may process the data to render virtual elements in real time, aligning them with the physical world as seen through the device's camera 162. The application 172 may utilize the device's 154 sensors, including IMUs 168 and accelerometers 166, to accurately track the device's 154 movements and orientation, ensuring that the virtual elements remain correctly positioned and responsive to user interactions. In some embodiments, the update process is continuous, allowing for dynamic adjustments as the user moves and interacts with the AR environment. The AR module 176 returns, at step 906, to the sensor module 174.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A system comprising:
a phased array antenna;
an antenna module configured to:
   detect, using the phased array antenna, wireless signals from at least one user device in an environment; and
   determine a location of the at least one user device in the environment;
a synthetic aperture radar (SAR) system configured to:
   transmit, via the phased array antenna, microwave radar signals into the environment;
   receive, via the phased array antenna, reflected signals from the environment including information about at least one of a distance and a movement of one or more objects in the environment; and
   generate a three-dimensional (3D) spatial map of the environment based on the reflected signals, wherein the 3D spatial map includes the location of the at least one user device;
a device module configured to:
   connect to the at least one user device; and
   receive, from the at least one user device, sensor data;
an orientation module configured to determine orientation information for the at least one user device based on the sensor data; and
an integration module configured to integrate data including the 3D spatial map, the location of the at least one user device, the orientation information, and the sensor data to create an augmented reality (AR) representation of the environment.

2. The system of claim 1, wherein the antenna module determines the location of the at least one user device by triangulation or trilateration.

3. The system of claim 1, wherein the antenna module operates in a passive mode by detecting the wireless signals from the at least one user device without first pinging the at least one user device.

4. The system of claim 1, wherein the antenna module operates in an active mode by initially pinging the at least one user device via the phased array antenna before detecting the wireless signals from the at least one user device.

5. The system of claim 1, wherein the antenna module utilizes at least one of a Kalman filter, a Joint Probabilistic Data Association (JPDA) operation, or a Multiple Signal Classification (MUSIC) algorithm for refining the location of the at least one user device.

6. The system of claim 1, wherein the phased array antenna includes multiple antenna elements that are electronically steerable to direct a radar beam in different directions without physically moving the phased array antenna.

7. The system of claim 1, wherein the SAR module uses time delay or frequency shift information from the reflected signals to determine the at least one of the distance and the movement of the one or more objects.

8. The system of claim 1, wherein the sensor data includes at least one of accelerometer data and gyroscope data.

9. The system of claim 1, wherein the orientation module includes or utilizes an AR framework module to overlay the AR representation of the environment in real time onto a live camera feed on a user device.

10. The system of claim 1, wherein the orientation module continuously updates the orientation information in real time to reflect any changes in the location or movement of the at least one user device.

11. The system of claim 1, wherein the integration module includes at least one virtual marker in the AR representation and provides a gesture-based interface to allow a user to interact with the AR representation using one or more gestures.

12. A method comprising:
  detecting, using a phased array antenna, wireless signals from at least one user device in an environment;
  determining a location of the at least one user device in the environment;
  transmitting, via a synthetic aperture radar (SAR) system using the phased array antenna, microwave radar signals into the environment;
  receiving, via the phased array antenna, reflected signals from the environment including information about at least one of a distance and a movement of one or more objects in the environment;
  generating a three-dimensional (3D) spatial map of the environment based on the reflected signals, wherein the 3D spatial map includes the location of the at least one user device;
  connecting to the at least one user device;
  receiving, from the at least one user device, sensor data;
  determining orientation information for the at least one user device based on the sensor data; and
  integrating data including the 3D spatial map, the location of the at least one user device, the orientation information, and the sensor data to create an augmented reality (AR) representation of the environment.

13. The method of claim 12, wherein determining the location of the at least one user device includes determining the location of the at least one user device by triangulation or trilateration.

14. The method of claim 12, wherein detecting comprises passively detecting the wireless signals from the at least one user device without first pinging the at least one user device.

15. The method of claim 12, wherein detecting comprises initially pinging the at least one user device via the phased array antenna before actively detecting the wireless signals from the at least one user device.

16. The method of claim 12, wherein determining the location of the at least one user device includes refining the location using at least one of a Kalman filter, a Joint Probabilistic Data Association (JPDA) operation, or a Multiple Signal Classification (MUSIC) algorithm.

17. The method of claim 12, wherein the phased array antenna includes multiple electronically steerable antenna elements, and wherein transmitting includes directing a radar beam in different directions without physically moving the phased array antenna.

18. The method of claim 12, wherein the at least one of a distance and a movement of the one or more objects in the environment are determined by time delay or frequency shift information from the reflected signals.

19. The method of claim 12, wherein receiving sensor data includes receiving at least one of accelerometer data and gyroscope data.

20. The method of claim 12, wherein integrating includes overlaying the AR representation of the environment in real time onto a live camera feed on a user device.

21. The method of claim 12, wherein determining orientation information includes continuously updating the orientation information in real time to reflect any changes in the location or movement of the at least one user device.

22. The method of claim 12, wherein integrating includes integrating at least one virtual marker in the AR representation and providing a gesture-based interface to allow a user to interact with the AR representation using one or more gestures.

* * * * *